US009244149B2

(12) United States Patent
Piersol et al.

(10) Patent No.: US 9,244,149 B2
(45) Date of Patent: Jan. 26, 2016

(54) APPLICATIONS FOR GEOGRAPHICALLY CODED ACCESS POINTS

(75) Inventors: Kurt W. Piersol, Campbell, CA (US); John W. Barrus, Menlo Park, CA (US); Stephen R. Savitzky, San Jose, CA (US); Sergey Chemishkian, Cupertino, CA (US)

(73) Assignee: Ricoh Co., Ltd., Tokyo (JP)

( * ) Notice: Subject to any disclaimer, the term of this patent is extended or adjusted under 35 U.S.C. 154(b) by 772 days.

(21) Appl. No.: 13/415,832

(22) Filed: Mar. 8, 2012

(65) Prior Publication Data

US 2012/0162013 A1 Jun. 28, 2012

Related U.S. Application Data

(63) Continuation of application No. 12/240,639, filed on Sep. 29, 2008, now Pat. No. 8,711,034, which is a continuation-in-part of application No. 12/132,507, filed on Jun. 3, 2008, now Pat. No. 8,089,405, said (Continued)

(51) Int. Cl.
*G01S 5/02* (2010.01)
*H04W 64/00* (2009.01)

(52) U.S. Cl.
CPC ........... *G01S 5/0236* (2013.01); *H04W 64/003* (2013.01)

(58) Field of Classification Search
USPC .................... 342/357.2, 357.21, 357.25, 386; 701/469, 532, 536
See application file for complete search history.

(56) References Cited

U.S. PATENT DOCUMENTS

| 5,121,126 A | 6/1992 | Clagett |
| 6,865,395 B2 | 3/2005 | Riley |
| 7,095,319 B2 | 8/2006 | Izumi |

(Continued)

FOREIGN PATENT DOCUMENTS

| EP | 1298847 | 4/2003 |
| JP | 2000308114 | 11/2000 |

(Continued)

OTHER PUBLICATIONS

Japanese Office Action for Japanese Patent Application No. 2008-256766 dated Feb. 12, 2013, 2 pages.

(Continued)

*Primary Examiner* — Dao Phan
(74) *Attorney, Agent, or Firm* — Patent Law Works LLP

(57) ABSTRACT

The present invention provides systems and methods for self-labeling access points with their geographic location from received beacon frames. In particular, the present invention transmits beacon frames including temporary location information from mobile devices. The beacon frames are received by an access point, filtered by the access point and then used to determine a location. Once the location has been determined, the access point uses the determined location to self-label itself by converting the location information to a geographic code and inserting it as part of the SSID of the access point's beacon signal. The present invention also includes a number of methods using geographic codes including a method for generating and transmitting geographic codes for mobile devices, a method for determining a location of an access point, a method for self-labeling an access point, and a method for filtering beacon frames.

18 Claims, 27 Drawing Sheets

Related U.S. Application Data application No. 13/415,832 is a continuation-in-part of application No. 12/132,508, filed on Jun. 3, 2008, now Pat. No. 8,265,652.

(60) Provisional application No. 60/977,055, filed on Oct. 2, 2007, provisional application No. 60/979,659, filed on Oct. 12, 2007.

(56) References Cited

U.S. PATENT DOCUMENTS

| | | | |
|---|---|---|---|
| 7,149,499 | B1 | 12/2006 | Oran |
| 7,289,931 | B2 | 10/2007 | Ebert |
| 7,903,005 | B2 | 3/2011 | Ueda |
| 2003/0080901 | A1 | 5/2003 | Piotrowski |
| 2003/0218539 | A1 | 11/2003 | Hight |
| 2004/0051664 | A1 | 3/2004 | Frank |
| 2005/0147073 | A1 | 7/2005 | Hietalahti |
| 2007/0055746 | A1 | 3/2007 | Oran |
| 2007/0121557 | A1 | 5/2007 | Sylvain |
| 2007/0127702 | A1* | 6/2007 | Shaffer et al. ............ 379/355.04 |
| 2008/0123608 | A1 | 5/2008 | Edge et al. |
| 2008/0133124 | A1* | 6/2008 | Sarkeshik ..................... 701/201 |
| 2008/0162519 | A1 | 7/2008 | Hsieh |
| 2008/0280624 | A1 | 11/2008 | Wrappe |
| 2009/0115661 | A1 | 5/2009 | Torimoto |

FOREIGN PATENT DOCUMENTS

| | | |
|---|---|---|
| JP | 2001339753 | 12/2001 |
| JP | 2001351188 | 12/2001 |
| JP | 2002202139 | 7/2002 |
| JP | 2002202144 | 7/2002 |
| JP | 2003284138 | 10/2003 |
| JP | 2003308326 | 10/2003 |
| JP | 2004104349 | 4/2004 |
| JP | 2005-009891 | 1/2005 |
| JP | 2005253018 | 9/2005 |
| JP | 2005300419 | 10/2005 |
| JP | 2006211168 | 8/2006 |
| JP | 2007110760 | 4/2007 |
| WO | 0163956 | 8/2001 |
| WO | 2004077753 | 9/2004 |
| WO | 2005106523 | 11/2005 |
| WO | WO2006001140 | 1/2006 |
| WO | 2007146406 | 12/2007 |

OTHER PUBLICATIONS

Final Office Action for U.S. Appl. No. 12/240,639, dated Jul. 5, 2013, 9 pages.

JP Office Action, JP Patent Application No. 2008-0256766, dated Nov. 6, 2012, 3 pages.

JP Office Action, JP Patent Application No. 2008-0256765, dated Nov. 6, 2012, 3 pages.

WAP WSP, Wireless Application Protocol Wireless Session Protocol Specification, dated May 4, 2000, 4 pages.

Hidetoshi Ueno, An Implementation of WAP Protocol and Its Push Application, Collected Papers of Multimedia, Distributed, Cooperative, and Mobile (DICOMO) Symposium, Edition of 1997-2006, Ver. 1.1 [DVD-ROM], Japan, Information Processing Society of Japan, vol. 2000, 7 pages.

US Office Action for U.S. Appl. No. 12/240,639, dated Nov. 23, 2012, 15 Pages.

"Ekahau—Home," Ekahau, Inc., 2000-2008, [online] [Retrieved on Oct. 15, 2008] Retrieved from the Internet<URL: http://www.ekahau.com/>.

"Eye-Fi >> Overview," Eye-Fi, [online] [Retrieved on Oct. 15, 2008] Retrieved from the Internet<URL: http://www.eve.fi/overview/>.

"Loki—You Can Get There From Here," Skyhook Wireless, Inc., 2006-2008, [online] [Retrieved on Oct. 15, 2008] Retrieved from the Internet<URL:http://loki.com>.

"Home," Novatel Wireless, Inc., 2008, [online] [Retrieved on Oct. 15, 2008] Retrieved from the Internet<URL:http://www.novatelwireless.com/>.

"Skyhook Wireless: > Home," Skyhook Wireless, Inc., 2008, [online] [Retrieved on Oct. 15, 2008] Retrieved from the Internet<URL:http://www.skyhookwireless.com/>.

"Skype Phone—Skype Headset—Skype Web Cam—Skype WiFI Phone—Accessories," [Skype Limited online] [Retrieved on Oct. 15, 2008] Retrieved from the Internet <URL:http://us.accessories.skype.com/servlet/ControllerServlet?Action=DisplayHomePage&Sit . . . > 1 page.

European Search Report, European Application No. 08165406.3, Feb. 6, 2009, 9 pages.

United States Office Action, U.S. Appl. No. 12/132,507, Nov. 26, 2010, 9 pages.

United States Office Action, U.S. Appl. No. 12/132,507, May 17, 2011, 8 pages.

United States Office Action, U.S. Appl. No. 12/132,508, Jun. 24, 2011, 16 pages.

United States Notice of Allowance, U.S. Appl. No. 12/132,507, Aug. 23, 2011, 6 pages.

United States Office Action, U.S. Appl. No. 12/132,508, Nov. 10, 2011, 23 pages.

United States Office Action, U.S. Appl. No. 12/240,639, May 10, 2012, 12 pages.

United States Notice of Allowance, U.S. Appl. No. 12/132,508, dated May 11, 2012, 17 pages.

* cited by examiner

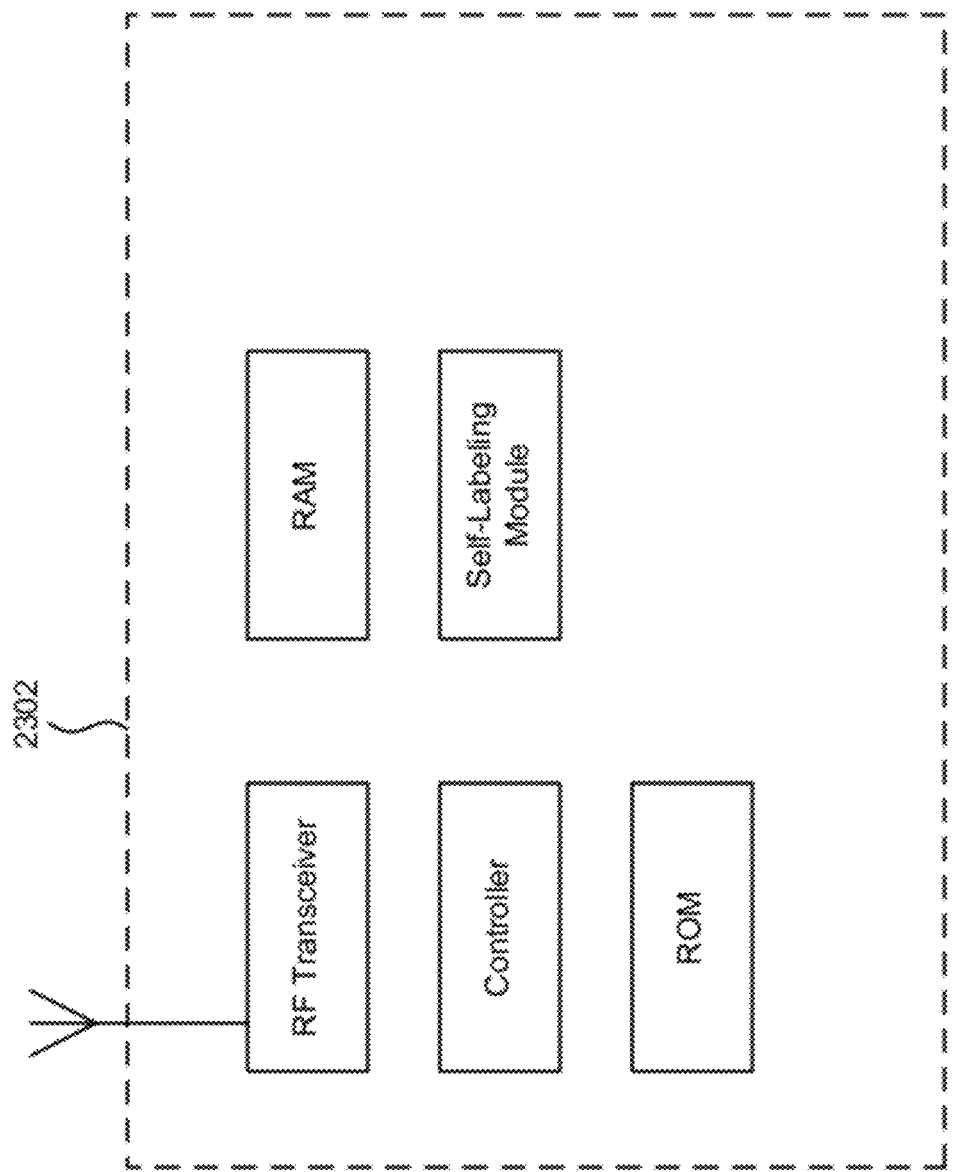

US 9,244,149 B2

APPLICATIONS FOR GEOGRAPHICALLY CODED ACCESS POINTS

CROSS REFERENCE TO RELATED APPLICATIONS

This application is a continuation of U.S. patent application Ser. No. 12/240,639, titled "Geographically Self-Labeling Access Points," filed Sep. 29, 2008, which is a continuation-in-part application of U.S. patent application Ser. No. 12/132,507, titled "Applications For Geographically Coded Access Points," filed Jun. 3, 2008, and U.S. patent application Ser. No. 12/132,508, titled "Applications For Geographically Coded Access Points," filed Jun. 3, 2008. This application also claims priority under 35 U.S.C. §119(e) from U.S. Provisional Patent Application No. 60/977,055, titled "Geographic Tagging of Network Access Points," filed Oct. 2, 2007, and from U.S. Provisional Patent Application No. 60/979,659, titled "Applications And Users Of GeoFi System" filed Oct. 12, 2007, both of which are incorporated by reference herein in their entirety.

BACKGROUND OF THE INVENTION

1. Field of the Invention

The present invention relates to the field of geographic location systems in general, and specifically, to the use of network access points to provide geographic information. Still more particularly, the present invention relates to use of geographic codes transmitted as part of beacon signals for the self-labeling of access points.

2. Description of the Background Art

With the proliferation of portable computing devices such as laptop computers and personal digital assistants, and mobile communications devices such as smart phones and cellular telephones, it is advantageous for a user to be able to know their precise location. Knowing one's precise location along with the computational capabilities of such computing devices allows users to access information that can greatly simplify any number of tasks. For example, retrieving directions to an off-site meeting requires knowing your starting point. Similarly, searching for stores, companies, points of interest of interest, etc. requires that the user knows her location. While most present-day computing devices include an ability to communicate wirelessly with other devices or a network, most present-day computing devices do not include any way to determine the location of the computing device.

The prior art has attempted to solve this deficiency by including global positioning system (GPS) circuitry within laptop computers and cell phones. There are currently a number of different companies that manufacture GPS chips for inclusion in such portable computing and mobile communication devices. However, the addition of such global positioning systems to computing devices suffers from a number of deficiencies. First, the additional circuitry can be expensive. For example, GPS devices can range from several hundred dollars to thousands of dollars. Second, GPS devices typically need a significant amount of time to acquire position signals from satellites as well as perform the calculations necessary to determine location. For example, an initialization of the GPS circuitry can take several minutes. Even when the GPS device active, it takes a minimum of 35 seconds to establish the initial location of the computing device. Finally, the greatest disadvantage with GPS systems is that they do not function properly inside office buildings and in high density urban environments. The physical structure of the office buildings interferes with the position signals from the satellites which are sensitive to timing differences caused by signal bounces, and are too weak to penetrate many structures.

A second prior art approach uses a database of media access control (MAC) addresses and offers this information over a network such as the Internet as a location-based service. The database includes pairs of locations and MAC addresses. The pair information in the database is determined by hiring drivers in most major cities to map the MAC addresses of access points to locations in their city. To determine a location, the user need only retrieve the location corresponding to the access point MAC address from the database. However, this prior art solution also has a number of shortcomings. First, it requires that the user's computing device have a connection to the Internet in order to access the database and retrieve information from it, or have an extensive local database that may be out of date. Second, the location can only be identified to a level of precision of the transmission range of the access point.

Furthermore, the limitations of cost, inoperability indoors and requiring an Internet connection have reduced the applications that have been developed to use location information. Typically, location information has not been added to a variety of other activities because of the aforementioned limitations. For example, there are of uses for location information ranging from asset tracking to record-keeping to routing that have not been implemented or adopted because of the expense in obtaining geographic information.

Another problem in the art is how to label devices with their geographic location. Especially for devices that need to transmit their location, it is difficult to precisely locate a computing device and then provide that information so the computing device can send its location to others. Additionally for many installed computing devices, it is not an option to add a GPS system or similar device.

SUMMARY OF THE INVENTION

The present invention overcomes the deficiencies and limitations of the prior art by providing systems and methods for self-labeling access points with their geographic location from received beacon frames. In particular, the present invention transmits beacon frames including temporary location information from mobile devices. The beacon frames are received by an access point, filtered by the access point and then the temporary location information is extracted and used to determine a location. Once the location has been determined, the access point uses the determined location to self-label itself by converting the location information to a geographic code and inserting it as part of the SSID of the access point's beacon signal. The present invention also includes a number of methods for using geographic codes including a method for generating and transmitting geographic codes for mobile devices, a method for determining a location of an access point, a method for self-labeling an access point, and a method for filtering beacon frames.

BRIEF DESCRIPTION OF THE DRAWINGS

The present invention is illustrated by way of example, and not by way of limitation in the figures of the accompanying drawings in which like reference numerals are used to refer to similar elements.

FIG. 27 is a block diagram illustrating an embodiment of a self-labeling access point according to the present invention.

DETAILED DESCRIPTION OF THE PREFERRED EMBODIMENTS

Figure 1:
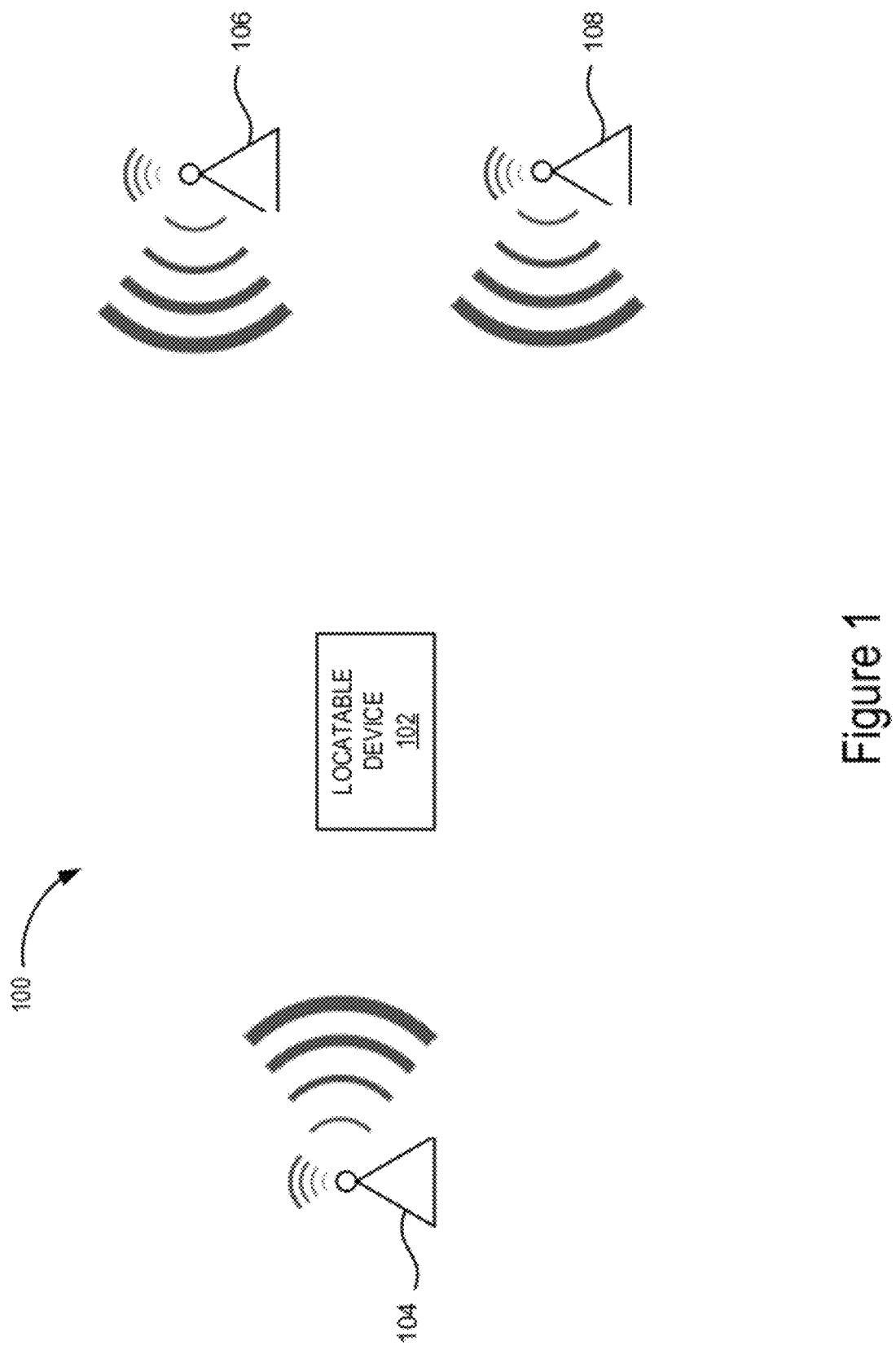
FIG. 1 is a high-level block diagram illustrating a first embodiment of a computing system including of the present invention.

A system and method for geographic tagging of network access points are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described in the context of network access points utilized by wireless networks and a portable computing device such as a laptop computer; however, those skilled in the art will recognize that the present invention may be implemented in other systems that that utilize beacon signals that are in part user configurable.

Reference in the specification to "one embodiment" or "an embodiment" means that a particular feature, structure or characteristic described in connection with the embodiment is included in at least one embodiment of the invention. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs and magnetic optical disks, read-only memories (ROMs), random access memories (RAMs), EPROMs, EEPROMs, magnetic or optical cards, or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

System Overview

FIG. 1 illustrates a block diagram of a distributed computing system 100 including the present invention. The distributed computing system 100 includes a locatable device 102 and a plurality of network access points 104, 106 and 108. The locatable device 102 is adapted for wireless communication with one or more of the plurality of network access points 104, 106 and 108. In one embodiment, the locatable device 102 is movable and the locatable device 102 receives signals to and from each access point 104, 106 and 108 when the locatable device 102 is within the communication range of a particular network access point 104, 106 and 108. Although not shown, the distributed computing system 100 also includes a network. The network (not shown) may comprise a conventional network such as a local area network (LAN), a wide area network (WAN), the Internet or other suitable communication system wired or wireless. The network is coupled to the plurality of network access points 104, 106 and 108.

The locatable device 102 is any computing device capable of receiving a beacon signal and decoding the geographic code embedded within the beacon signal. For example, the locatable device 102 includes a receiver for receiving the beacon and other processing capabilities to extract the geographic code from the beacon signal and decode it. In one embodiment, the locatable device 102 is a portable computing device such as a laptop computer in another embodiment, the locatable device 102 is a mobile communications device with computing capabilities such as a smart phone. In yet another embodiment, the locatable device 102 is any electronic device including a receiver and having other processing capabilities such as a printer, an audio recorder, a camera, a motion sensor, a photocopier, a diagnostic device, etc. Those skilled in the art will recognize that the locatable device 102 need not broadcast anything and in one embodiment just receives signals and processes them.

The plurality of access points 104, 106 and 108 are of a conventional type such as wireless access points used in computer networking. Although three access points 104, 106 and 108 are shown in FIG. 1 for illustration purposes, those skilled in the art will recognize that the principles of the present invention will work in any system that has a least one access point. The network access points 104, 106 and 108 are devices that that connect wireless communication devices (e.g. the locatable device 102) together to form a wireless network. In one embodiment as noted above, each of the plurality of access points 104, 106 and 108 may be coupled to a wired network. In another embodiment, they are nodes of a wireless mesh network. The plurality of access points 104, 106 and 108 are used to relay data between wireless devices and wired devices. In one embodiment, the access points communicate using the IEEE 802.11 standard, although in other embodiments beacon signals of other standards may also be used in accordance with the principles of the present invention. Unlike the prior art, the plurality of access points 104, 106 and 108 are geographically tagged with location information. In one embodiment, the location information is the position of the access point 104, 106 and 108 in terms of longitude and latitude. In another embodiment, the location information also includes the height of the access point. This location information is encoded into a geographic code. In another embodiment, the location information encoded into a first geographic code and second geographic code or a prefix and a geographic code. In accordance with the present invention, the geographic code(s) is included as part of the beacon signal or frame and transmitted by the access points 104, 106 and 108 to other devices within range. For example, the beacon signal or frame is transmitted by the access point 104, 106 and 108 several times a second. The geographic code(s) as part of the beacon signal is described below in more detail with reference to FIG. 3. In particular, for the configuration shown in FIG. 1, the first access point 104 would transmit a beacon signal including a first geographic code representing an encoded value of its location; the second access point 106 transmits a beacon signal including a second geographic code representing an encoded value of its location which is different from the location of the first access point, and thus, the second geographic code is different than the first geographic code; and the third access point 108 transmits a beacon signal including a third graphic code representing and coded value of its location which is different from the location of both the first access point 106 and second access point 108.

Figure 2:
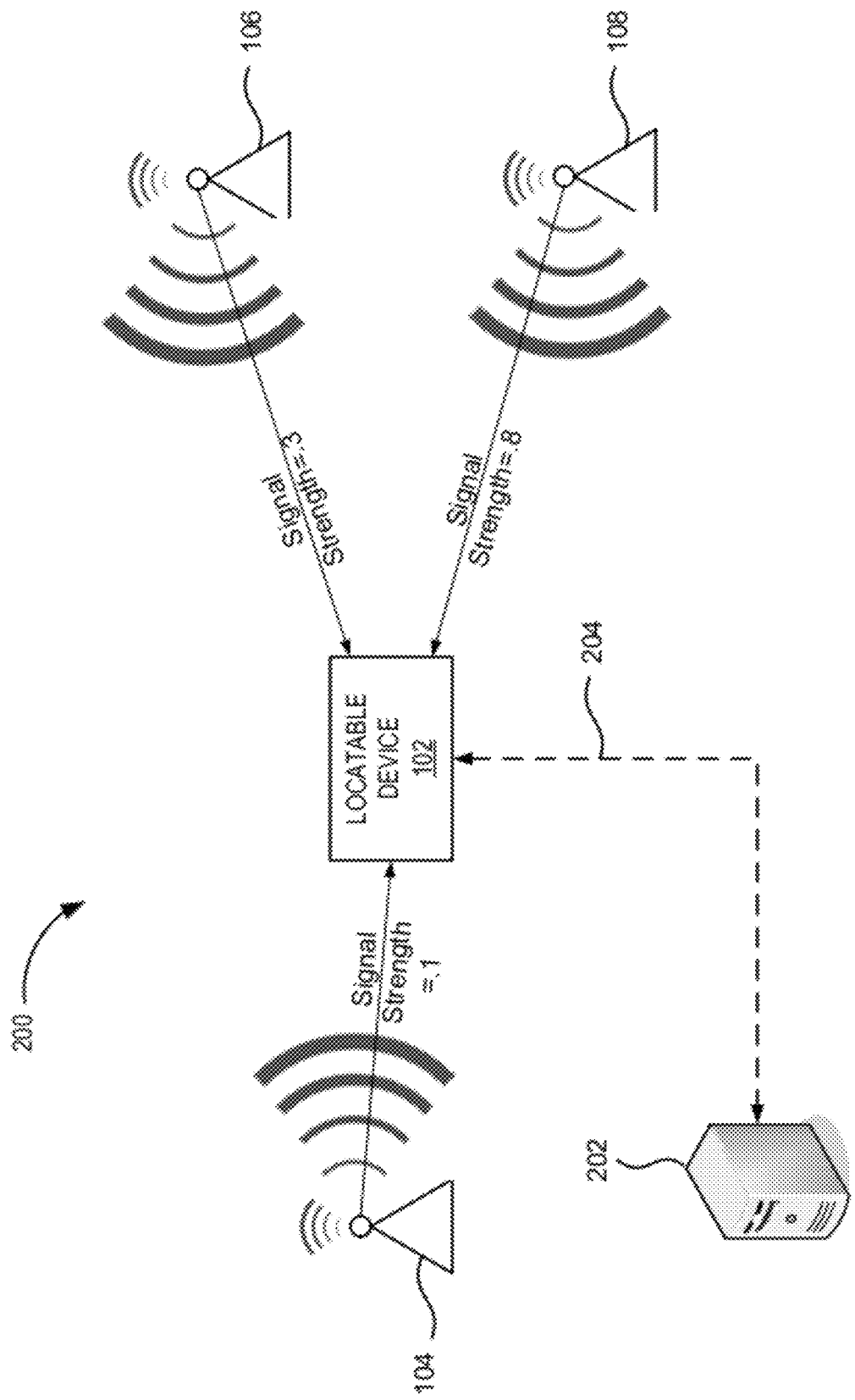
FIG. 2 is a high-level block diagram illustrating a second embodiment of a computing system including of the present invention.

Referring at FIG. 2, another embodiment of the system 200 is shown. The system 200 includes the locatable device 102, the first access point 106, the second access point 108, and the third access point 108. These components have a similar form and function as that described above with reference to FIG. 1 so that description will not be repeated here. The system 200 also includes a geolocation service provided from a server 202 and a network connection 204 from the locatable device 102 to the server 202. In one embodiment, the geolocation service provided from the server 202 provides additional information related to particular geographic locations in response to requests. The network connection 204 from the locatable device 102 to the server 202 may be for example a wireless network connection provided by a mobile communications carrier to a smart phone. Using the added functionality provided by the network connection 204 and the server 202, the locatable device 102 can determine its location using the geographic codes from the access points 104, 106 and 108, and request services or information based on its location from the geolocation service provided by the server 202.

The Geographic Codes

Figure 3:
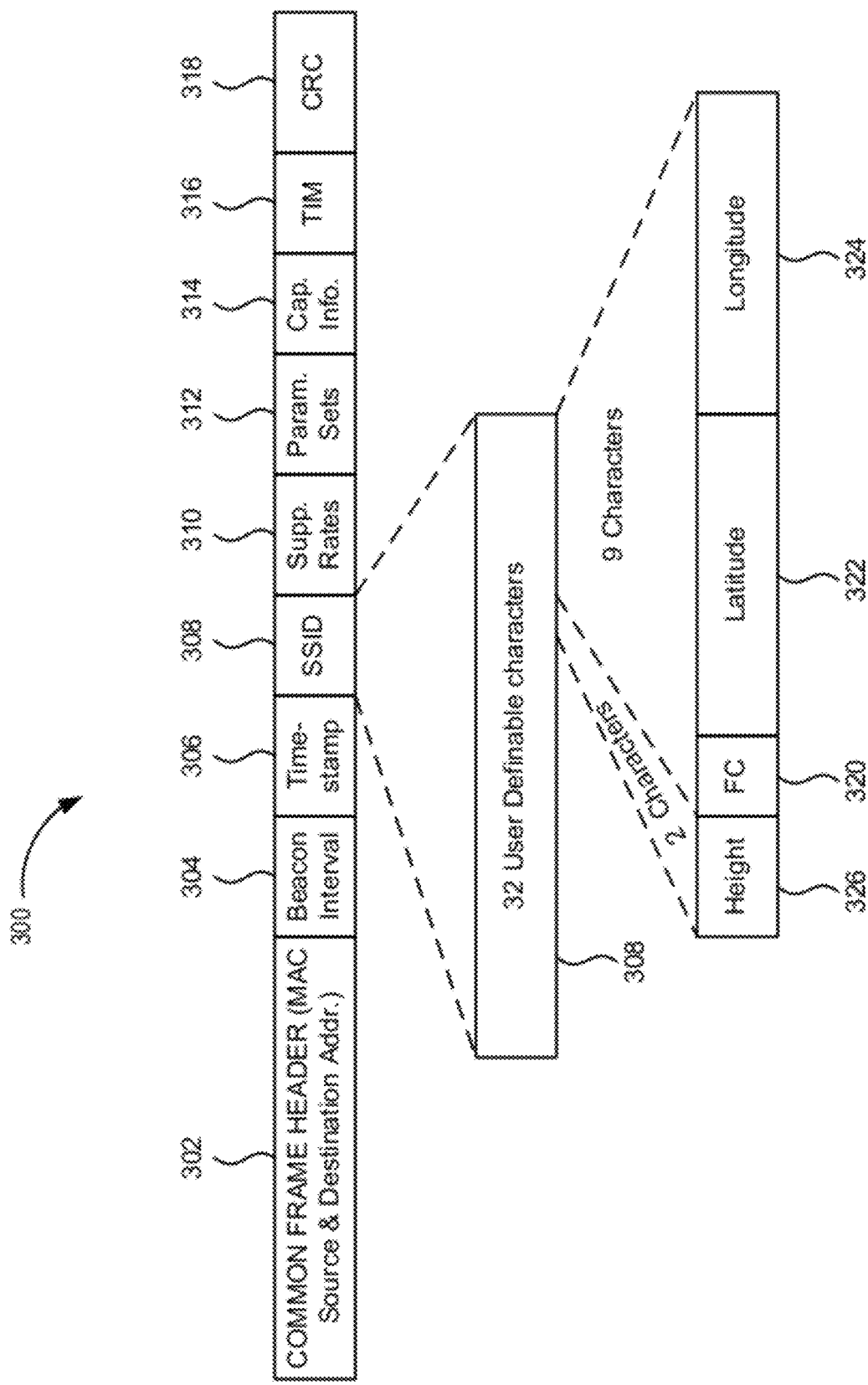
FIG. 3 is block diagram of a service set identifier and geographic codes according to one embodiment of the present invention.

Referring now to FIG. 3, one embodiment for the geographic codes used in the present invention will be described. FIG. 3 is a block diagram of a beacon frame or signal 300 in accordance with the present invention. The beacon frame 300 preferably comprises a common frame header 302, a beacon interval 304, a timestamp 306, a service set identifier (SSID) 308, supported rate field 310, a parameter set field 312, capability information field 314, a traffic indication map (TIM), and a cyclical redundancy check (CRC) field. In general, the beacon frame 300 is approximately 50 bytes long.

The common frame header 302 includes source and destination MAC addresses as well as other information regarding the communications process. The destination address is always set to all ones, which is the broadcast Medium Access Control (MAC) address. This forces all other stations on the applicable channel to receive and process each beacon frame. The common frame header 302 is about have of the beacon frame 300.

The beacon interval 304 includes a value that represents the amount of time between beacon frame 300 transmissions. Before any locatable device 102 enters a power save mode, the locatable device 102 needs the beacon interval to know when to wake up to receive the next beacon and learn whether there are buffered frames at the access point 104, 106 and 108.

The timestamp 306 is a value of the network clock corresponding to the access point 104, 106 and 108. After receiving a beacon frame 300, the locatable device 102 uses the timestamp value to update its local clock. This process enables synchronization among the locatable devices 102 that are associated with the same access point 104, 106 and 108.

The supported rate field 310 stores information about the supported rates. Each beacon frame 300 carries information that describes the rates that the particular wireless LAN supports. For example, a beacon frame 300 may indicate that only 1, 2, and 5.5 Mbps data rates are available. As a result, the locatable device 102 would stay within limits and not use 11 Mbps. With this information, locatable devices 102 can use performance metrics to decide which access point 104, 106 and 108 with which to associate.

The parameter set field 312 includes information about the wireless parameters. The beacon frame 300 includes information about the specific signaling methods (such as frequency hopping spread spectrum, direct sequence spread spectrum, etc.). For example, a beacon frame 300 would include in the appropriate parameter set the channel number that an access point 104, 106 and 108 is using. Likewise, a beacon frame 300 belonging to frequency hopping network would indicate hopping pattern and dwell time.

The capability information field 314 store capability information for network access. The capability information identifies requirements of locatable devices 102 that wish to belong to the wireless LAN that the beacon frame 300 represents. For example, this information may indicate that the locatable devices 102 must use wired equivalent privacy (WEP) in order to participate on the network.

The traffic indication map (TIM) 316 is sent in the beacon frame 300 to identify which stations using power saving mode have data frames waiting for them in the access point's buffer. The TIM 316 identifies all unicast packets for the locatable devices 102 in doze mode. The locatable devices 102 the poll the access point 104, 106 and 108 for packets using the association ID that the access point 104, 106 and 108 assigned during the association process.

The cyclical redundancy check (CRC) field 318. The CRC field 318 provides error detection capability.

The service set identifier (SSID) 308 is a user definable and human readable name that identifies an access point 104, 106 and 108, and thus, its corresponding wireless LAN. Before associating with a particular wireless LAN, a locatable device 102 must know the SSID 308 of the access point 104, 106 and 108. By default, access points 104, 106 and 108 include the SSID 308 in the beacon frame 300 to enable sniffing functions (such as that provided by Windows XP) to identify the SSID 308 and automatically configure the wireless network interface card (not shown) with the proper SSID 308. Some access point vendors have an option to disable the SSID 308 from being broadcast in the beacon frame 300 to reduce security issues. The SSID 308 is, by definition, up to 32 user ASCII characters. During set up of the access point 104, 106 and 108, the user has the ability to set the value of the SSID 308. For example, networks are often named by system administrators with descriptive names that the users will recognize when they attempt to associate with the access point 104, 106 and 108.

As shown in FIG. 3, the present invention advantageously encodes the precise geographic coordinates of the access point 104, 106 and 108 into a geographic code, and inserts that geographic code as part of the SSID 308. While the description below will describe the geographic code and SSID 308 for a particular access point 104, those skilled in the art will recognize that the geographic codes and SSIDs 308 of the other access points 106 and 108 have a similar form and functionality.

In one embodiment, the geographic code is an encoded value of the precise geographic coordinates (longitude and latitude) of the access point 104. In this embodiment, the geographic code is the last nine characters of the SSID 308. The geographic code comprises a first character 320 encoding multiplier values, four characters representing a latitude value, and four characters representing the longitude value, LONCODE 324. The encoding scheme of the present invention will be described in more detail with reference to FIG. 5 below. It is particularly advantageous for the geographic code to be the last nine characters of the SSID 308 because it allows the preceding 23 characters to be used in a conventional manner by the user or system administrator to give the access point 104 a human readable name that the user will recognize. However, those skilled in the art will recognize that the geographic code of the present invention could be in any other position within the SSID 308. Furthermore, the nine characters used for geographic code need not be contiguous.

In another embodiment, the SSID 308 also includes two additional characters for storing a second geographic code or prefix representing the height of the access point 104. In this embodiment, the two additional characters precede the nine characters for the geographic code. Those skilled in the art will recognize that in other embodiments these two characters could be in any other position within the SSID 308. The use of SSID 308 with encode values is particularly advantageous because it does not have adverse effects on the access point 104 as a router. Furthermore, since most access points 104 broadcast SSID information several times a second, whether or not a user can connect to that access point 104, the SSID can be listened to passively by a radio receiver. This can be done with very low power on the locatable device 102, which never needs power a transmitter to get the information.

General Method

Figure 4:
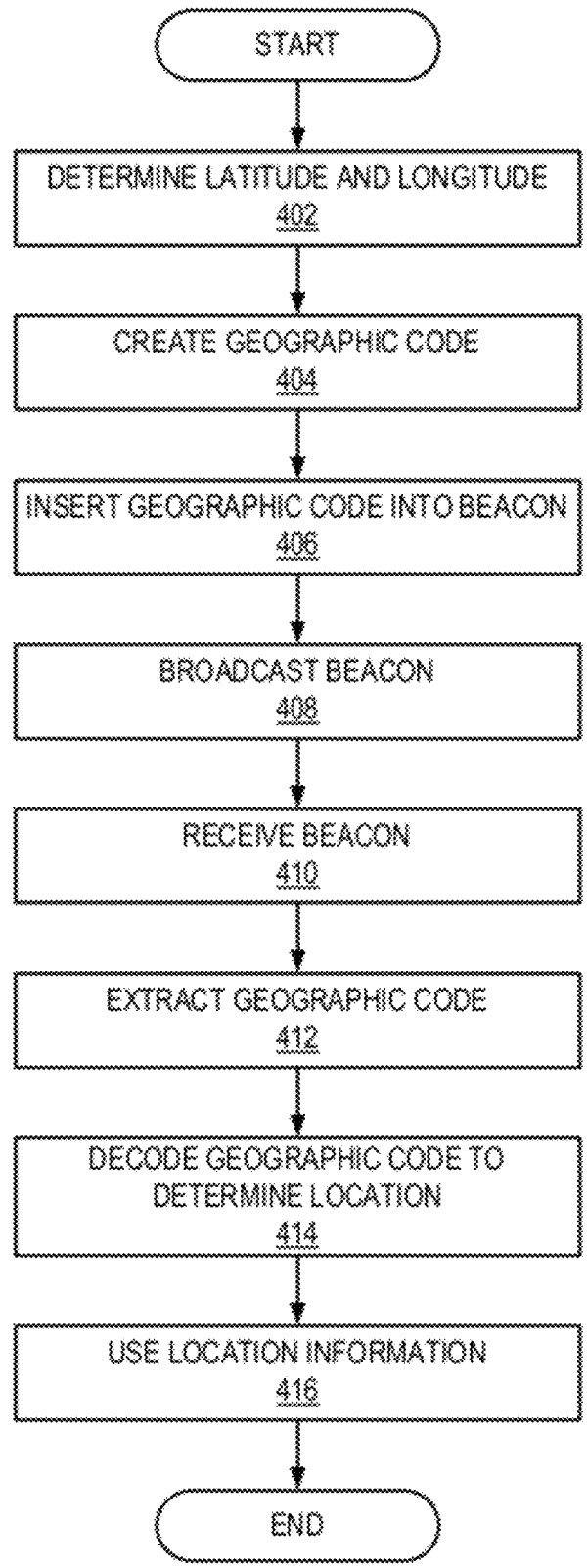
FIG. 4 is a flowchart illustrating a general process for geographic tagging of network access points according to one embodiment of the present invention.

Referring now to FIG. 4, an embodiment of a method for geographic tagging in accordance with the present invention will be described. By way of example and for ease of understanding, the method will be described in the context of a particular access point, access point 104, however those skilled in the art will recognize that the portions of the process described below may be repeated for any number of access points (e.g., 106 and 108). The process begins by determining 402 the latitude and longitude for a given access point 104. In order to create the geographic code, a user must precisely specify the latitude and longitude coordinates for the access point 104. One method is to use a mapping program, such as Google Maps, to allow a user to place a marker and the latitude and longitude coordinates are provided to the user. In another embodiment, an external location device such as a GPS device can be placed near the access point 104 and the latitude and longitude coordinates determined that way or any other similar manual manner. In yet another embodiment, the location of the device could be manually compared to precise survey data produced by any of a number of standard surveying techniques.

Next, the method creates 404 a geographic code. The precise geographic coordinates are encoded using a compact encoding into the geographic code. As has been described above with reference to FIG. 3, in one embodiment the geographic code is a nine character encoded value. In another embodiment, a first geographic code and a second geographic code or prefix are used with the first geographic code being a latitude and longitude and the second geographic code being a height. The processes for creating these geographic codes will be described in more detail below with reference to FIGS. 5 and 7.

Next, the method inserts 406 the geographic code into the beacon signal of the access point 104. For example, most access points 104, 106 and 108 allow the installer or person who sets up the access point to configure the service set identifier (SSID) 308 which is broadcast as part of the access point's beacon. This can be done at set up for example with a computer (not shown) connected to the access point 104. The SSID 308 is provided to the access point 104 such as through a graphical user interface in which the user inputs the desired SSID value into a dialog box and the SSID value is stored at the access point 104 for broadcast as part of the beacon. For example, the user would use conventional access point management software to insert the code as the final characters of the access point SSID 308. In one embodiment, only a single code with the longitude and latitude is inserted in step 406. In another embodiment, a first and second code are inserted in step 406, the second code being 2 characters in length and representing the height and the first code being nine characters in length and representing the longitude and latitude. In one embodiment, the geographic codes are inserted at the end of the SSID 308. This approach is advantageous because it allows the remaining 21 or 23 characters of the SSID code to be used for words easily recognizable by users to distinguish this access point from other access points. However those skilled in the art will recognize that the geographic codes can be positioned at any agreed upon character locations within the SSID.

It should be understood that steps 402, 404, 406 can be repeated for any number of access points, and once each of these steps have been performed for each access point 104, 106 and 108, they have been geographically tagged in accordance with the present invention.

Then the access point 104 broadcasts 408 the beacon including the geographic code(s).

The general method continues to use these geographic tags once the access points 104, 106 and 108 have been configured with them.

The locatable device 102 receives 410 the beacon signal from a particular access point 104. Next, the locatable device 102 extracts 412 the geographic code from the received beacon signal. This can be performed by software operable on the locatable device 102. In one embodiment, since the locatable device 102 knows that the geographic code is located within the SSID 308, the locatable device 102 need only determine the SSID 308 and extract the characters representing the geographic code from the SSID 308. In one embodiment, the geographic code is the last 9 characters of the SSID 308. In another embodiment, the geographic codes are the last 11 characters of the SSID 308. Next, the method continues by decoding 414 the geographic codes to determine the geographic location of the access point 104. In one embodiment, the method decodes the first geographic code representing the longitude and latitude. In another embodiment, the method also decodes a second geographic code representing the height. Embodiments of the decoding process are described in more detail below with reference to FIG. 6 and FIG. 8. Once the geographic location has been determined, it can be used 416 for any number of applications. For example, as will be described below with reference to FIG. 9, a geographic location of the access point 104 can be used to determine a precise location of the locatable device 102.

Encoding Method

Figure 5:
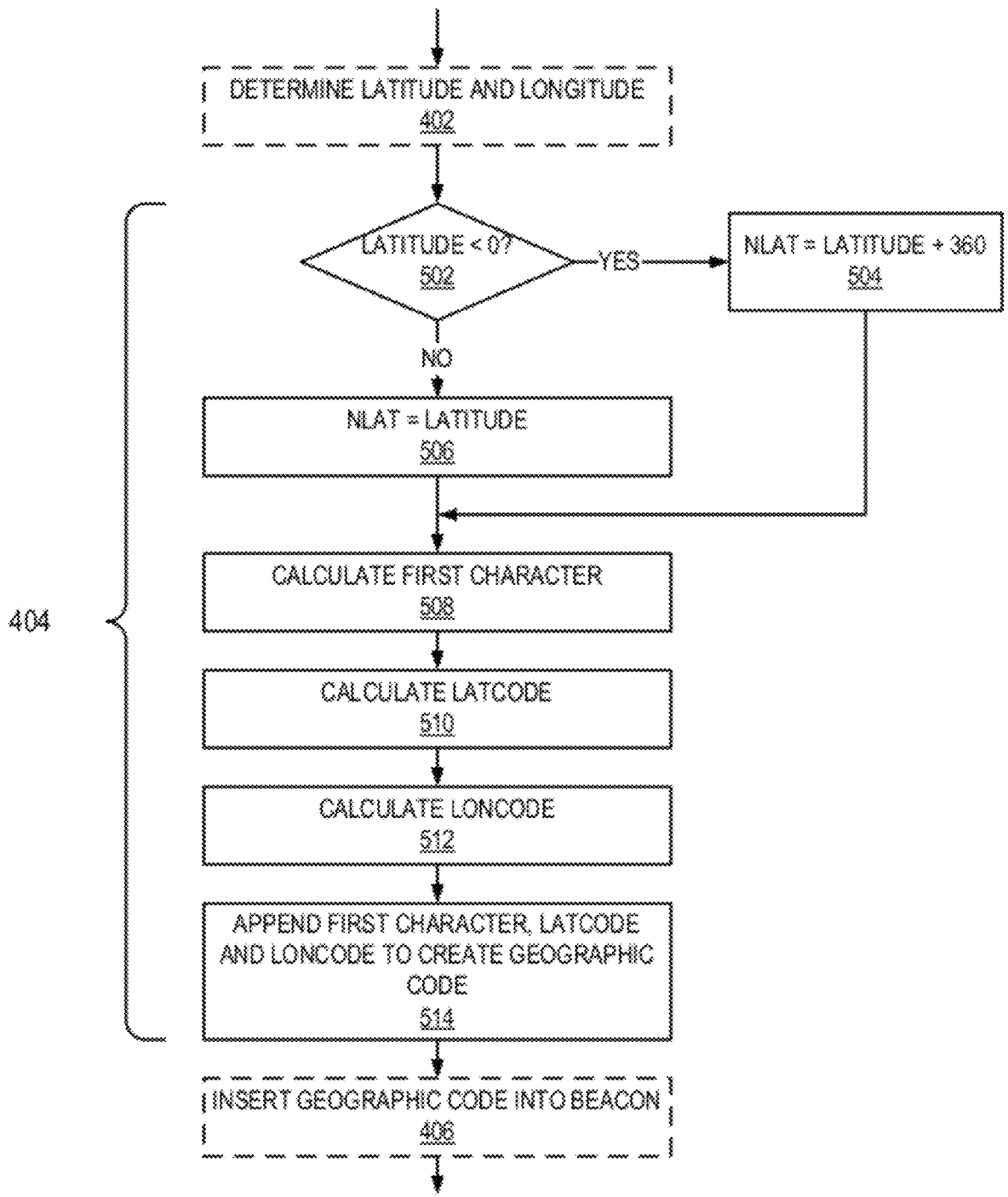
FIG. 5 is a flowchart illustrating a process for encoding a geographic location into a geographic code according to one embodiment of the present invention.

Referring now to FIG. 5, one embodiment of a method for encoding a geographic location into a geographic code in accordance with the present invention will be described. The present invention generates a geographic code by encoding the latitude and longitude into a pair of Base 60 numbers with the two highest order bits from each combined into an initial hex digit. The resulting geographic code uses nine characters to encode a position which is precise to a distance of roughly 2.5 feet at the equator.

As shown in FIG. 5, the longitude and latitude of an access point 104 have already been determined (see step 402 shown with dashed lines). The method begins by scaling the longitude and latitude to $0 <= x < 360$. The method then determines 502 whether the latitude is less than zero. Since the latitude is often referred to in terms of north and south latitudes, with north represented in positive degrees and the south represented in negative degrees, one embodiment of the present invention scales the latitude to be in the range of 0° to 360°. Thus, if it is determined 502 that the latitude has a negative value, the method continues to step 504 to use as a value of the latitude, NLAT, the latitude plus 360°. If it is determined 502 that the latitude does not have a negative value then the method continues to step 506 to use as a value of the latitude, NLAT, the latitude value determined in step 402. The method represents the latitude and longitude each as a 5-character string by multiplying their value by 144000, rounding to the nearest integer, and converting the result to Base 60 using the "digits" 0-9, A-Z, and a-x. Next, the method continues by calculating 508 the value of the first character 320. In one embodiment, the first character 320 is computed by taking the high-order character of the latitude, multiplying by 4, and adding the high-order character of the longitude to form a hex digit. The first digit of the longitude (in the range of 0-3 because it is a multiplier of 90 degrees and the range is 0-270) is multiplied by 4 and added to the first digit of the latitude which results in a number between 0 and 15 (a hex digit). This can be generated directly using the equation first character=inttochar((LON/90)*4+NLAT/90) where LON is the longitude value from step 402 and NLAT is the latitude value from either step 504 or 506. Then the method calculates 510 the value of the LATCODE 322. In one embodiment, the LATCODE 322 is calculated by taking the four lower-order characters of the latitude. This can be generated directly using the equation LATCODE=inttobase60((NLAT*144000) % 12960000). Then the method calculates 512 the value of the LONCODE 324. In one embodiment, the LONCODE 324 is calculated by taking the four lower-order characters of the longitude. This can be generated directly using the equation LONCODE=inttobase60((LON*144000) % 12960000). The creation of the geographic code is completed by appending 514 the first character 320, the LATCODE 322 and the LONCODE 324. Once created, the geographic code can be inserted 406 into the beacon signal. Those skilled in art will recognize that above encoding scheme is just one of many that may be used. For instance, in a preferred embodiment, a different set of symbols could encode the base 60 number, for instance replacing the "O" and "l" characters with "y" and "z" respectively, to prevent confusion of those characters with the "0" and "1" digits when typing the code. Other encoding schemes may be used with more or less accuracy and more or fewer characters. For example, the code for latitude 37.42195, longitude −122.21386 would be expressed as the geographic code "8yuqfcVQi".

By inserting this geographic code as the final nine characters of the SSID 308, the present invention makes the access point 104 a precise location beacon. This is advantageous because the beacon is more accurate than GPS, requires no additional hardware, and with the plethora of access points multiple beacons can be received by a locatable device 102 for position accuracy within 3 meters.

Figure 7:
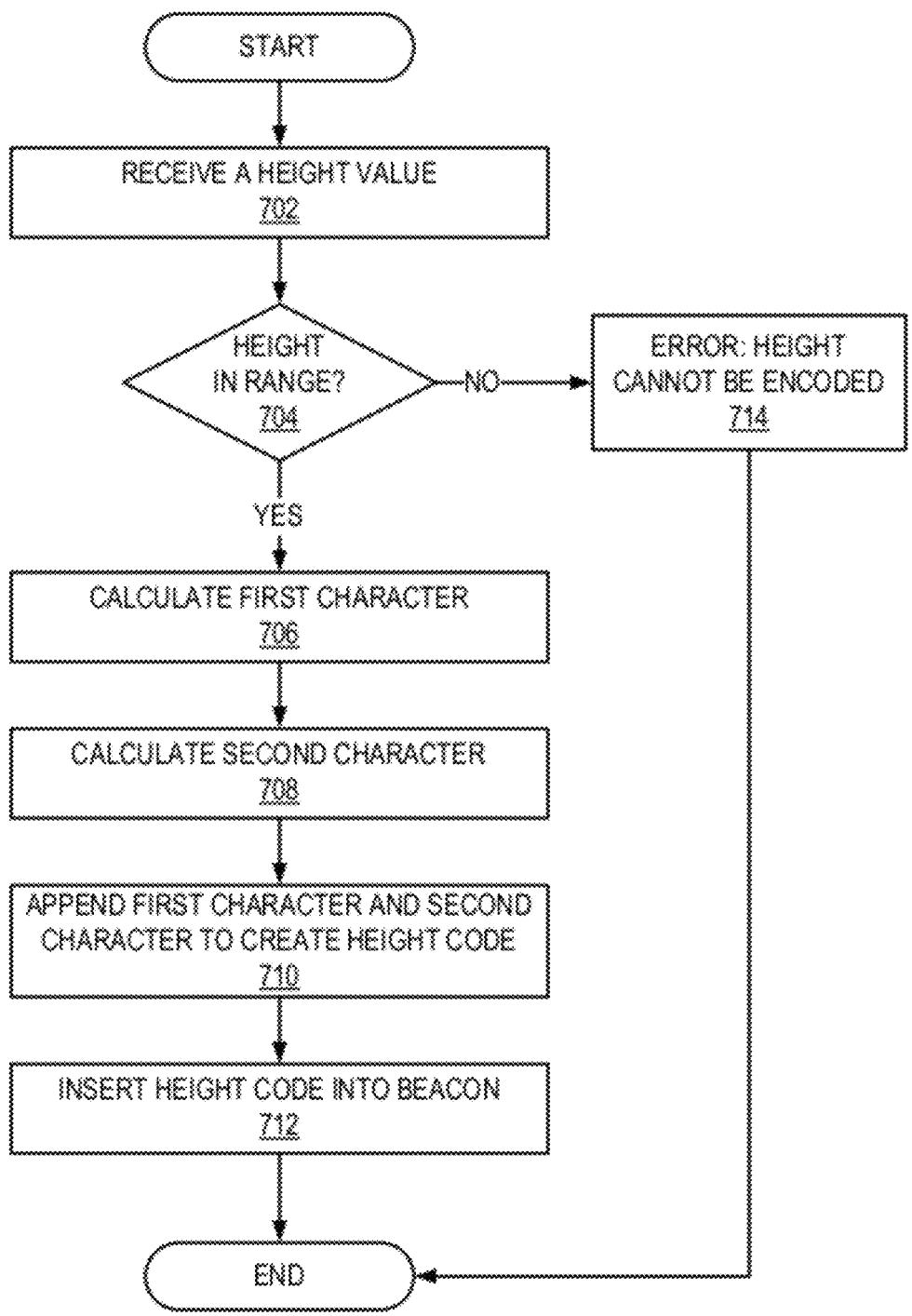
FIG. 7 is a flowchart illustrating a process for encoding a height into a geographic code according to one embodiment of the present invention.

Referring now also to FIG. 7, an embodiment of a method for encoding the height or altitude into the second geographic code or prefix in accordance with the present invention will be described. This embodiment includes height or altitude information as a two digit additional code that provides 600 possible height codes by allowing the first digit of the pair to represent a multiplier from 0-9, and the second to represent a base 60 number encoded just as specified above. This allows some structural redundancy to reduce the accidental appearance of a height code as part of an ordinary SSID word. The method begins by receiving 702 a height value. Next, the method determines 704 whether the height value is within a range that can be encoded. Since the present invention uses compact encoding and only uses two characters, the range of heights that can be encoded is limited to a range of approximately 1200 feet below ground to 4790 feet above ground. If the method determines 704 that the received height is not within that range, the method indicates 714 an error that the height cannot be encoded and the method ends. On the other hand, if the method determines 704 that the height is within the acceptable range, the method continues to step 706. In one embodiment, the value of the height is converted to two characters in base 60. In step 706, the method calculates 706 the value of the first character. The first character is generated by adding 1200 to the height value, dividing the sum by 600 and converting that amount to base 60. Next in step 708, the value of the second character is calculated. In one embodiment, the second character is determined by dividing the received height by 10 and converting the result into a base 60 value. Next, method appends 710 the first character and the second character to create a two character height code. For example, 0 (zero) feet above ground would be the prefix "20". The "20" prefix would be unused, redundant with the simpler 9 character code. Ten feet above ground would be the prefix "21" and 1190 feet below ground would be the prefix "01". Then the method inserts 712 the two character height code into the beacon signal. It should be clear to one skilled in the art that a further extension of this height code, using additional characters or using different symbols, could be easily constructed.

The particular embodiment for encoding geographic information has several valuable properties. Because it uses only visible and easily typed characters, and is relatively short, it is easy for a human to enter these codes into the access point SSID. By positioning it at the end of the SSID field, the code is easily detected as a code with fewer false positive results than scanning the entire SSID for such codes at any position. These code properties would also be valuable for attaching the codes to other forms of electronic data, such as documents or images, in fields originally intended to contain human readable codes.

Decoding Method

Figure 6:
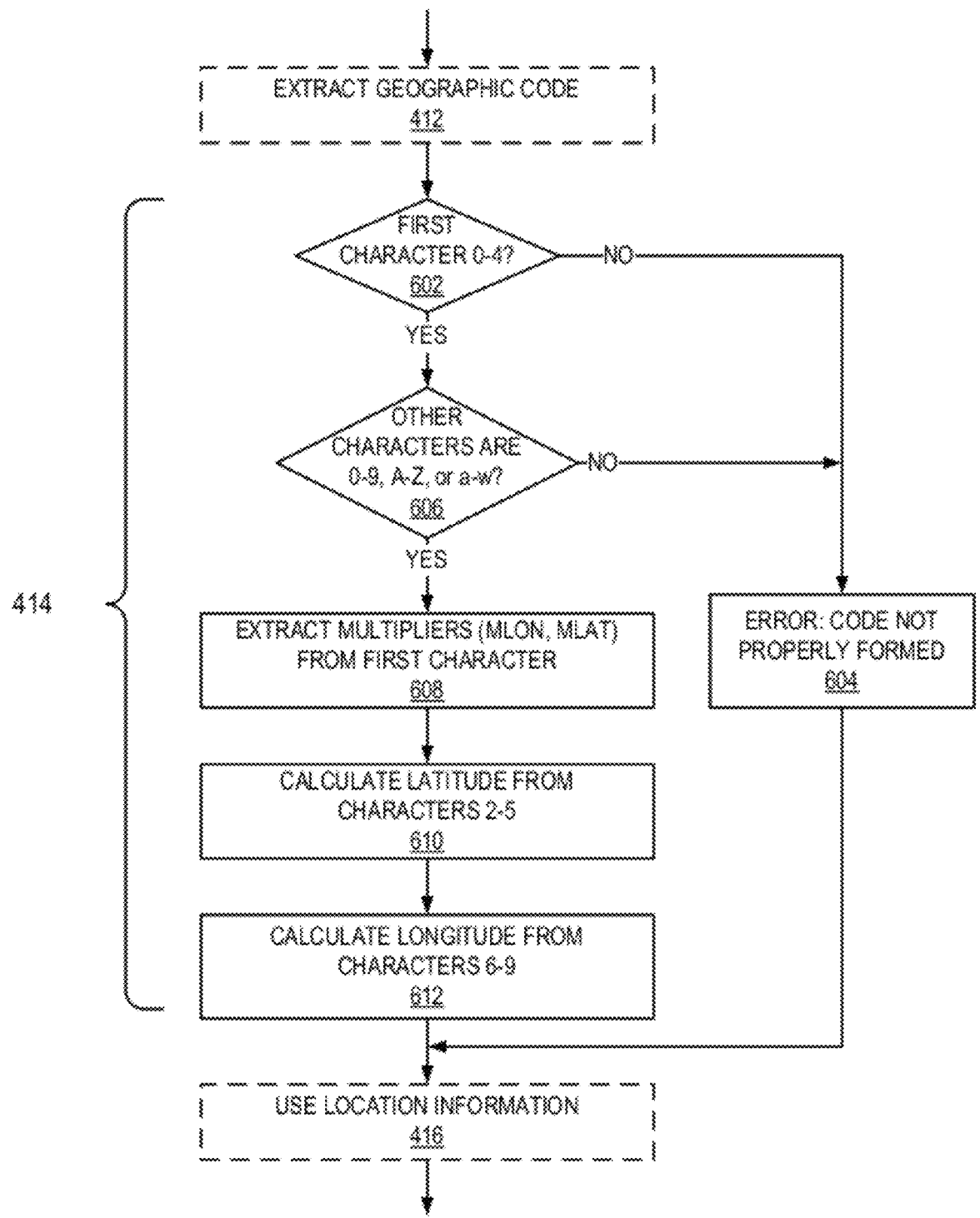
FIG. 6 is a flowchart illustrating a process for decoding a geographic code into location according to one embodiment of the present invention.

Referring now to FIG. 6, one embodiment of a method for decoding a geographic code into a location will be described. It should be noted that the locatable device 102 does not need to be connected to the internet through the access point 104; it merely needs to be able to receive the beacon signal. This is particularly advantageous because the locatable device 102 receives location information by listening to the access point broadcast a beacon. The beacon is always broadcast multiple times per second and includes the SSID which contains encoded latitude and longitude information. All WiFi access points support SSID broadcast and all can easily add the encoded information.

The method begins with a geographic code such as has been produced by the extraction step 412. Next, the method determines the 602 whether the first character of the geographic code is within a proper character range. For example, using the encoding scheme described above with reference to FIG. 5, the first character of the geographic code must be a character from 0-9 or A-F (e.g., any hex character). If the method determined 602 that the first character is not within the proper character range, the method signals or outputs 604 an error indicating that the code was not properly formatted or that the characters extracted are not a geographic code. On the other hand if it was determined 602 that the first character was within the proper character range, the method continues in step 606 to determine whether the other characters are within a proper character range. In one embodiment, the proper character range for the other characters is 0-9, A-Z or a-x. Again, using the encoding scheme described above with reference to FIG. 5, the remaining characters of the geographic code must be an character from 0-9, A-Z or a-x. If the method determined 606 that any of the remaining characters are not within the proper character range, the method proceeds to step 604 to signal or output and error signal indicating that the code is not properly formatted.

However if the method determined 606 that all of the remaining characters are within the proper character range, the method continues to step 608. In step 608, the method extracts a pair of multipliers, MLAT and MLON, from the first character. The first multiplier is a latitude multiplier and the second multiplier is a longitudinal multiplier. The first and second multipliers are generated by converting the first character from hex to integer, using the two lower digits as the MLAT and the two higher digits as the MLON. These multipliers are used to re-create the longitude and latitude values from the geographic code. Then the method calculates 610 the latitude from the second through fifth characters of the geometric code. In one embodiment, the latitude is equal to base60toint(char2-5)+(90*MLAT). Finally, the method calculates 612 the longitude from the sixth through ninth characters. In one embodiment, the longitude is equal to base60toint(char6-9)+(90*MLON). For example, the code "8yuqdcVQp" represents the geographic coordinates latitude 37.42194, longitude −122.21381.

Figure 8:
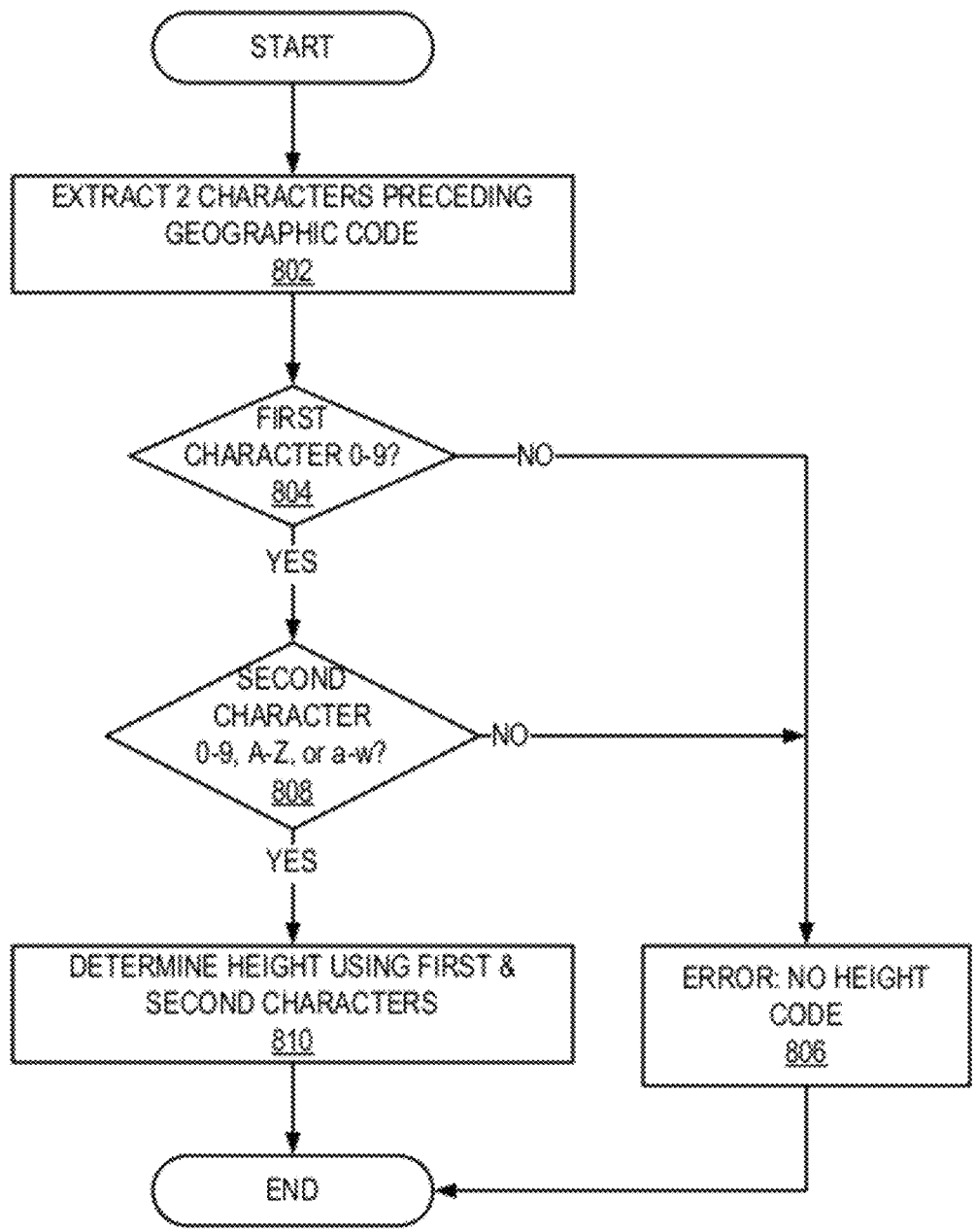
FIG. 8 is a flowchart illustrating a process for decoding a geographic code into height according to one embodiment of the present invention.

Referring now to FIG. 8, one embodiment of the method for calculating a height value of an access point from a prefix or geographic code will be described. The method begins by extracting 802 the prefix or second geographic code. Similar to the first geographic code, the prefix or second geographic code may be part of the SSID 308 broadcast by the access point 104, 106 and 108. The method determines 804 whether the first character of the second geographic code is within a proper range. In one embodiment, the proper range for the first character of the second geographic code is from 0-9. If the method determined 804 that the first character of the second geographic code was not within the proper range, the method proceeds to step 806 to output or signal an error indicating that either there was no height code included in the SSID 308 or that the height code was not properly formatted. On the other hand if the method determined 804 that the first character of the second geographic code was within the proper range, the method proceeds to step 808 to determine whether the second character is also within the proper range. In one embodiment, the proper range for the second character is 0-9, A-Z or a-x. If the method determined 808 that a second character was not within the proper range, the method continues to step 806 as has been described above to output an error code and then ends. If however, the second character is determined 808 as within the proper range, the method determines 810 the height using the first character and the second character. In one embodiment, the specified height is in base 60. The height can be calculated by converting the second character from base 60 to an integer value and multiplying the result by 10 then adding the value of converting the first character from base 60 to an integer value and multiplying that integer value by 600 and subtracting 1200. This can be computed directly with the equation height=base60toint(char 2)*10+(600*base60toint(char 1)−1200). This provides a value of the height of the access point 104 above ground. For cases, where the access point is below ground, the code can give a value to a depth of 1200 feet.

These decoding methods are particularly advantageous because they allow the locatable device to location with accuracy greater than GPS, within a fraction of a second, and even in dense urban environments and inside of buildings.

EXAMPLE

Figure 9:
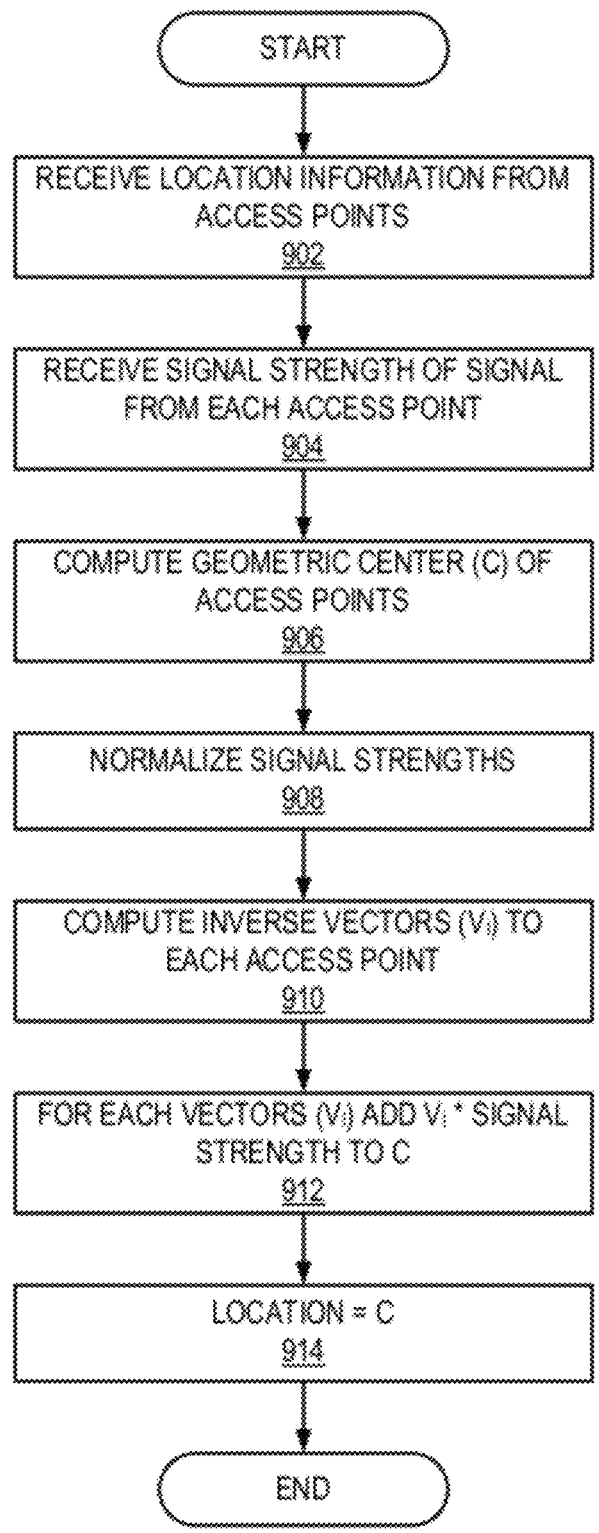
FIG. 9 is a flowchart illustrating a process for determining a location of a computing device using the beacon signals network access points according to one embodiment of the present invention.

Referring now to FIG. 9, one embodiment of a method for determining the location of the locatable device 102 will be described. The method begins by receiving 902 location information from a plurality of access points 104, 106 and 108. For example the location information can be a geographic code or a prefix and a geographic code. In one embodiment, the method receives location information from at least three access points. While the geographic information from one access points can be used to determine the general location, it will result in a number of possible locations. Next method determines the signal strength of the signal received from each access point 104, 106 and 108. Referring now also to FIG. 2, example signal strengths for each access point is shown. The method then computes 906 the geometric center, C, of the access points 104, 106 and 108. Next method normalizes 908 the signal strength received from each access point 104, 106 and 108. For example, the signal strength between the first access point 104 and the locatable device 102 is 0.1; the signal strength between the second access point 106 and the locatable device 102 is 0.3; and finally, the signal strength between the third access point 108 and the locatable device 102 is 0.8. Then the method computes 910 an inverse vector, $V_i$, to each access point. Then the method modifies the value of the geometric center, C, by adding 912 the inverse vector, $V_i$, multiplied by its corresponding signal strength, $S_i$ to the calculated geometric center from step 906. This step of addition 912 is performed for each vector computed in step 910. This effectively adjusts the computed center of the access points 104, 106 and 108 for the relative signal strengths of each access point 104, 106 and 108 as received by the locatable device 102. The end result is that the location of the locatable device 102 is equal 914 to the modified value of the geometric center. Those skilled in the art will recognize that the above method can be modified to use height codes as well. In such an embodiment, the method is similar, except the third dimension is added to each vector computation. Thus, a 3-dimensional centroid between codes is computed, and each signal strength adjustment is performed using a 3 element position vector. This location determination method is advantageous because it is very fast and a locatable device 102 can determine its location in seconds using very simple calculations.

It is clear that access points might be mislabeled, either as an attack or simply because an SSID happens by accident to appear to be a valid code. In such cases, the software attempting to fix location might cross-check the distances between the access points, and reject points which appear to be clearly incorrect. For example, an 802.11 access point has a range of approximately ten meters under normal operating conditions. If one of the labels appears to indicate that one access point is three miles from two or more other access points currently visible, then that access can be assumed to have been mislabeled and the data from that access point ignored for purposes of location computation. Alternatively, the locatable device 102 might check against other information sources, such as a GPS receiver or accelerometer, to determine that some access point labels should be ignored. For example, an access point that appeared to contradict a high confidence GPS location might be ignored if it appears to be outside the accuracy limits of the GPS signal, or it might be used by preference as more precise if it fell within the accuracy limits of the GPS signal. Alternatively, if the device is known by accelerometer to have traveled less than a hundred feet, but suddenly an access point becomes visible indicating that a hundred miles have been traversed, we can assume that the new access point label is incorrect.

Geographic Code Generation

Figure 10:
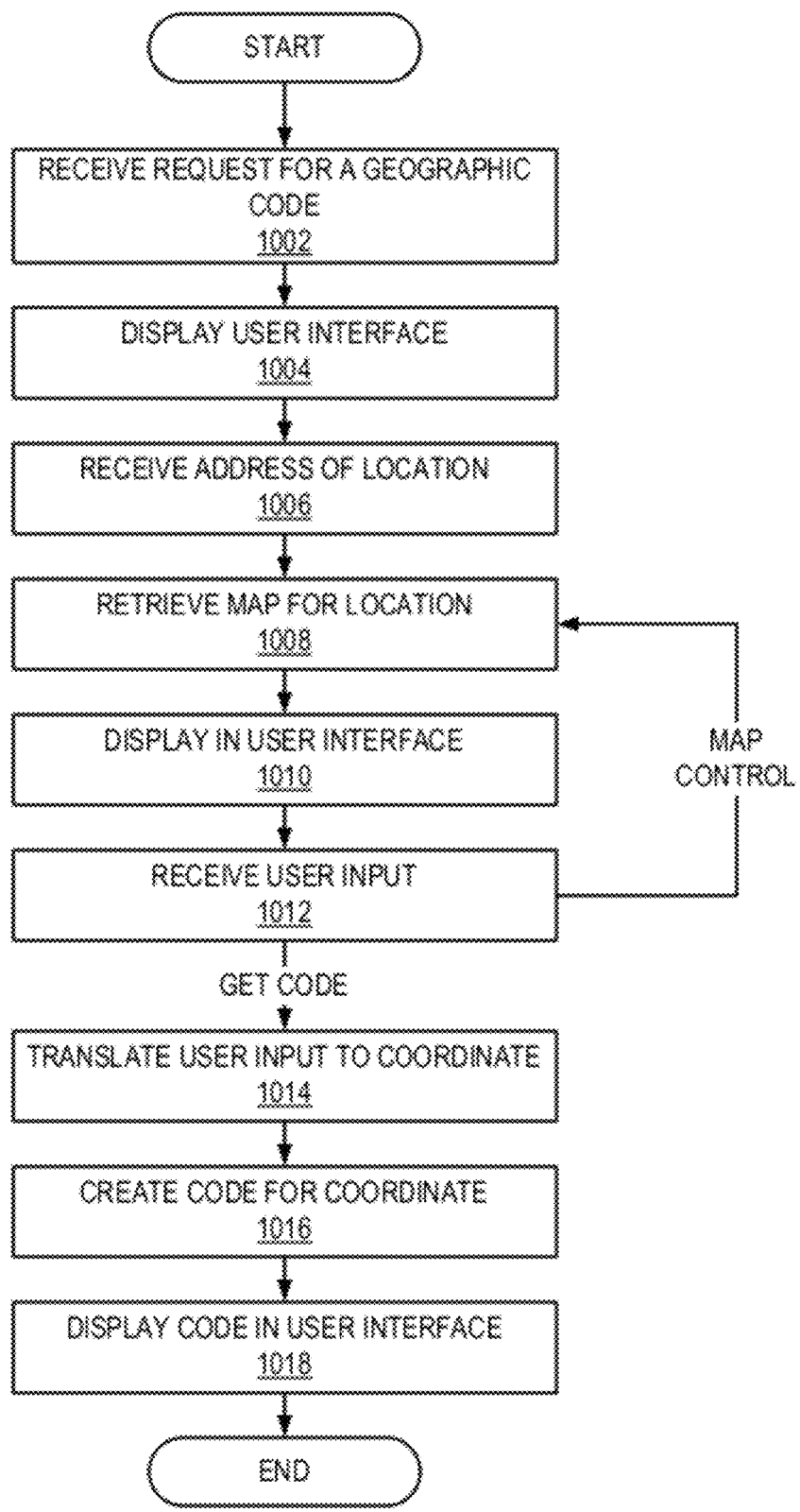
FIG. 10 is a flowchart illustrating an embodiment of a process for generating and presenting a geographic code in response to a request from a user according to the present invention.
Figure 11:
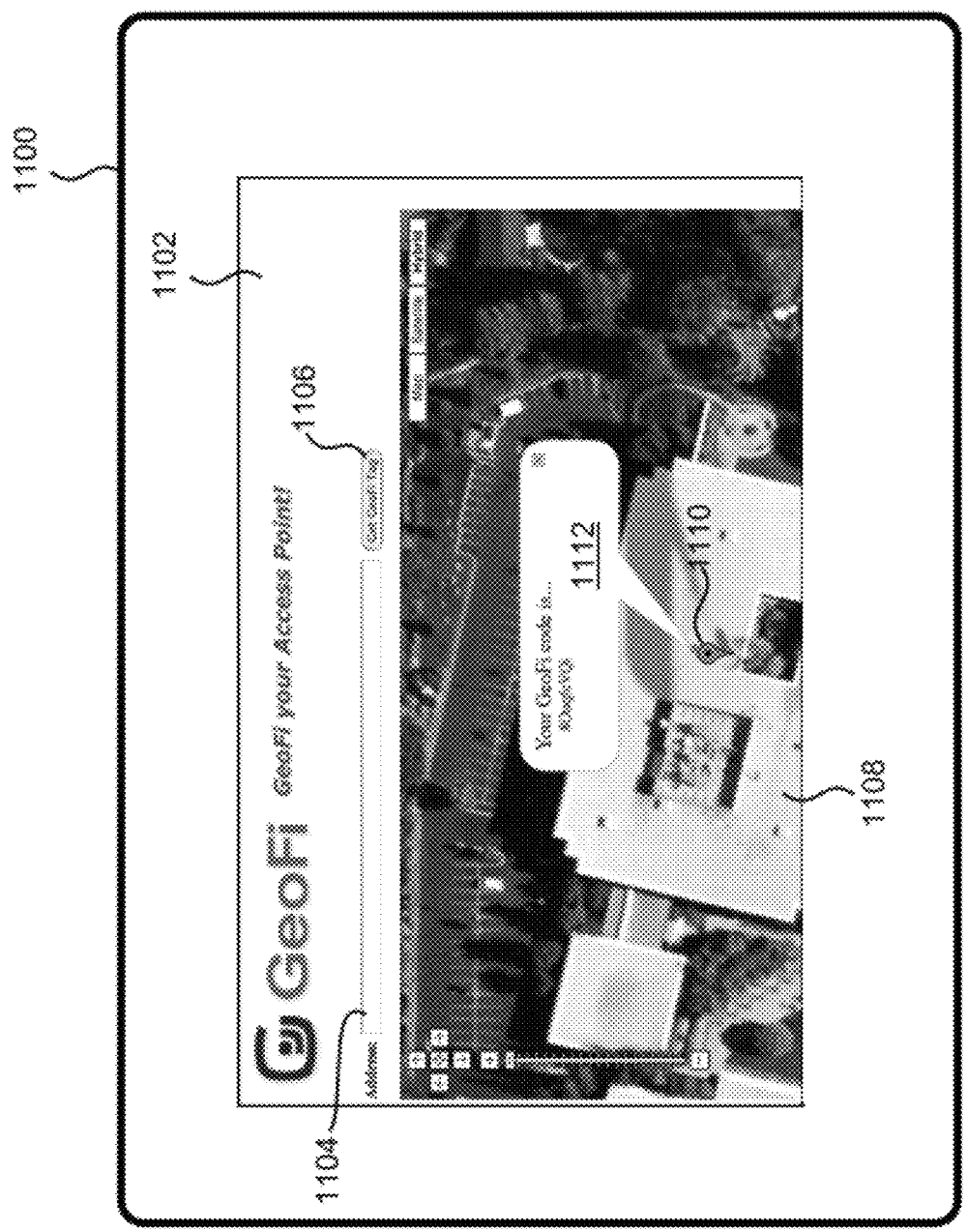
FIG. 11 is a graphical representation of an embodiment of a user interface for generating and presenting a geographic code according to the present invention.

Referring now to FIGS. 10 and 11, a method for generating and presenting a geographic code (also referred to in this application as a "geographic tag") in response to a request from a user will be described. This method uses a mapping program to allow a user to place a marker precisely on the map, and then calculates the resulting geographic code. The method begins by receiving 1002 a request from a user for geographic code. For example, this may be done on a personal computer by with the user using an input device to select a button that initiates the operation of a software program implementing this method. In response, a software program or system implementing the present invention displays 1004 a user interface 1102. Referring also to FIG. 11, one embodiment of an example user interface 1102 is shown. FIG. 11 is a graphical representation of a display device 1100 showing the user interface 1102 of the present invention. As can be seen, the user interface 1102 advantageously includes a label and an input area or box 1104 for inputting a street address, a button 1106 for generating a geographic code, and a map area 1108 for depicting a plan view of a particular location. The map area 1108 is a conventional type and in addition to presenting a plan view of the location, the map area 1108 provides selection buttons for switching between a street view, a satellite and a hybrid view. The map area 1108 also provides buttons for moving the location being depicted as well as zooming in and out. The method continues to receive 1006 an address of a location from the user such as via input box 1104. In response, the process retrieves 1008 a map for the address received in step 1006. The map is then displayed 1010 in the map area 1108 of the user interface 1102. The user is able to input a variety of different map controls such as have been described above, a mouse click over a particular location, or selection of the button 1106 for generating the geographic code. The method receives 1012 the user input and process it. If the user input is a map control, the method process of the user input and returns to step 1008 to retrieve a map for the modified location, zoom level or view. If the user input is a mouse click, the method determines the position on the map corresponding to the position at which the mouse was clicked, and temporarily stores the position. If the user input was selection of the button 1106 for generating a geographic code, the method continues to step 1014 where the temporarily stored position is translated to coordinates, such as longitude and latitude, for the location. These coordinates are then used to create 1016 a geographic code. The geographic code can be generated in a manner similar to that as has been described above with reference to FIG. 5. Finally, the user interface 1102 is updated to display 1018 the geographic code and a marker 1110. As shown in FIG. 11, the marker 1110 is positioned with the user clicked the mouse, and a comment box 1112 including the geographic code is shown. For the example user interface 1102 depicted in FIG. 11 shows the geographic code is "8OuqfcVQi". The user may then take this code and use it along with software for setting up an access point and insert it with other human readable characters into the SSID. Those skilled in the art will recognize that the above described process may be combined with setup software to initialize an access point. With such a combination, the geographic code could be semi-automatically added by the access point configuration software to the SSID.

In an alternate embodiment, this software process could be incorporated into a decoding client (a locatable device with the geographic code software the present invention operable thereon). The decoding client that wishes to use geographic codes can display a simple button which asks the map display to be centered near the current location. Alternatively, the client might simply keep the map display constantly updated, or might have a wide array of other affordances where geographic code information might be inserted. For example, the current location code might be into text, or as numeric information into a spreadsheet.

Rejecting Geographic Codes

Figure 12:
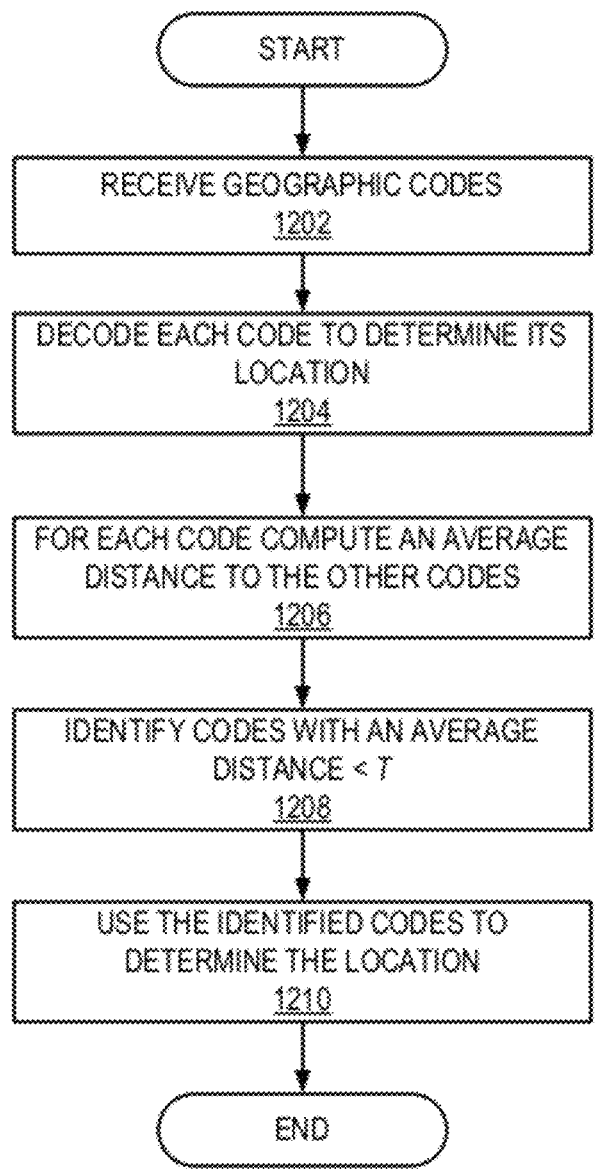
FIG. 12 is a flowchart illustrating a first embodiment of a process for rejecting incorrectly labeled geographic codes according to the present invention.
Figure 13:
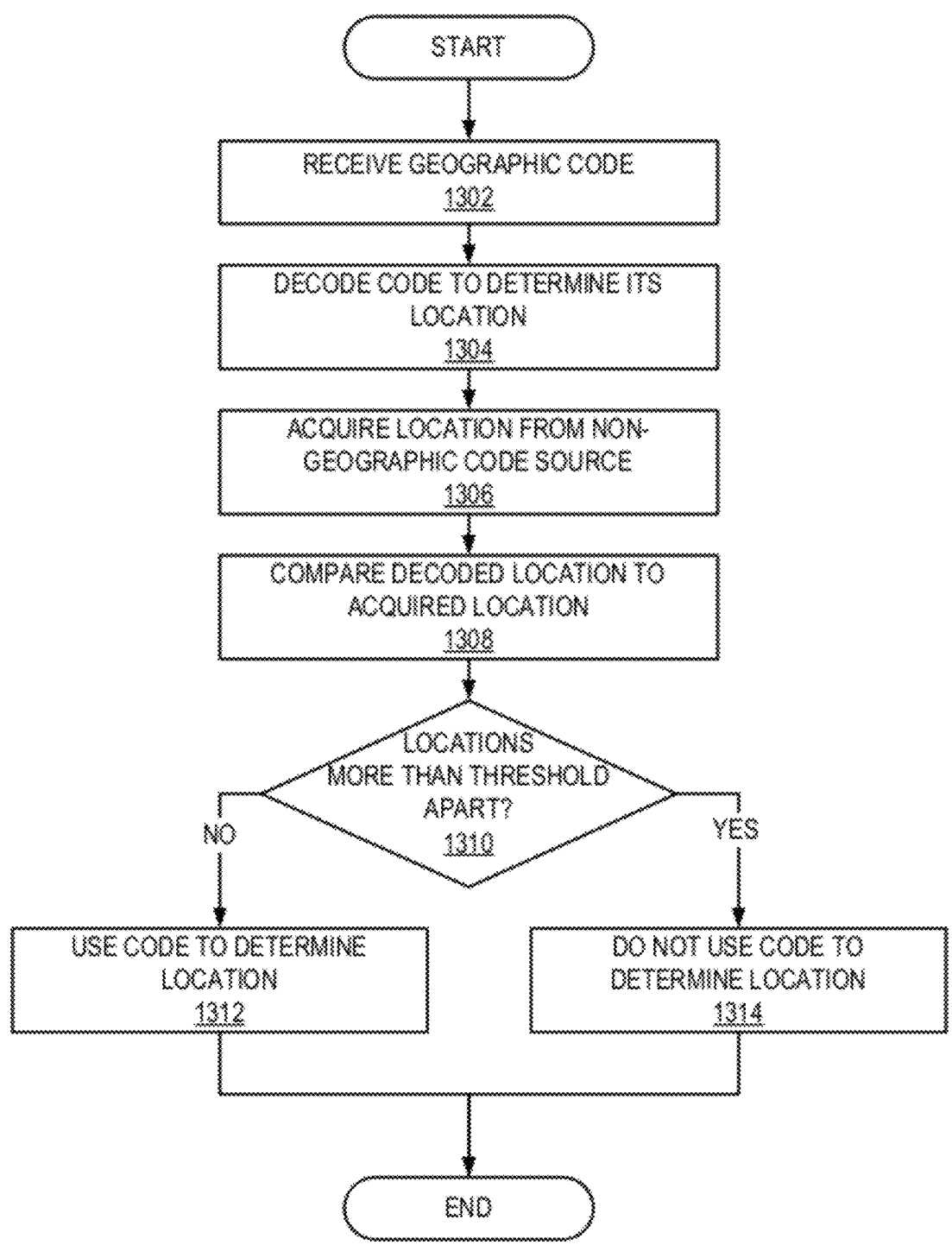
FIG. 13 is a flowchart illustrating a second embodiment of a process for rejecting incorrectly labeled geographic codes according to the present invention.

It is clear that someone can set up malicious access points with misleading geographic codes. Indeed, it is quite likely that some points will appear to have valid geographic codes by accident. Access points and their names or SSIDs are controlled by companies and individuals—there is no guarantee that the owner of an access point will add the correct geographic code or will add any code at all. Simple sanity checks against previously calculated locations, the time that has passed, and other visible access points should mitigate such problems almost entirely. Referring now to FIGS. 12 and 13, embodiments for rejecting or filtering the geographic codes for such instances of incorrectly labeled access points will be described. Referring first to FIG. 12, one embodiment for rejecting incorrectly labeled geographic codes will be described. When a tagged access point is mislabeled, and three or more at access points are visible, the present method makes it possible to reject the mislabeled access points. The method begins by receiving 1202 geographic codes from a plurality of access points. The number of access points from which geographic codes are received is preferably greater than three. Next, each geographic code received in step 1202 is decoded 1204 to determine the location of its associated access point. Then, for each geographic code, an average distance to other location of other codes is computed 1206. Next, any geographic codes with an average distance less than a predetermined threshold are identified 1208. The geographic codes with an average distance less than a predetermined threshold (T) are presumed to be correctly labeled. The geographic codes with an average is greater than a predetermined threshold are presumed to be mislabeled. The threshold could be obtained in any number of ways such as by statistical measures, empirical testing, trial and error, or by manual selection. For example, the threshold may be simply selected to reject any distance greater than about a hundred feet since that is the typical range at which a WiFi access point can be detected. Finally, since the identified codes are presumed to be correctly labeled, they are used to determine 1210 the location. For example, the location method described above with reference to FIG. 9 can be used to compute the location of the locatable device 102 receiving these geographic codes. This is particularly advantageous because it leads to greater accuracy in calculating the location of the locatable device 102.

Referring now to FIG. 13, a second embodiment of a method for rejecting incorrectly labeled geographic codes will be described. This method begins by receiving 1302 a geographic code. The received geographic code is then decoded 1304 to determine a location. Next on the method acquires 1306 a location from a non-geographic code source. For example, the locatable device 102 may include an accelerometer that provides information about how far the locatable device 102 has traveled. If the locatable device 102 has knowledge of its prior location (such as from a previously encountered access point) and has traveled 500 meters in last two minutes, an independent computation of location can be provided using data from the accelerometer. In another example, the locatable device 102 may be a smart phone with GPS capabilities that uses a GPS computation to provide the location generated in step 1306. Next, the method compares 1308 the decoded location (from step 1304) to the acquired location (from step 1306). Then, the method determines 1310 whether the decoded location and the acquired location are more than a threshold apart. In one embodiment, the threshold is about 100 meters. If the locations are more than a threshold apart, the geographic code is not used 1314 to determine location since it is quite likely that it is a mislabeled access point. If the locations are not more than a threshold apart, then the geographic code is used 1312 to determine the location. Those skilled in the art will recognize that this method has been described using only a single geographic code, however, it may be applied in parallel to a plurality of geographic codes.

Discovering Network Services

Figure 14:
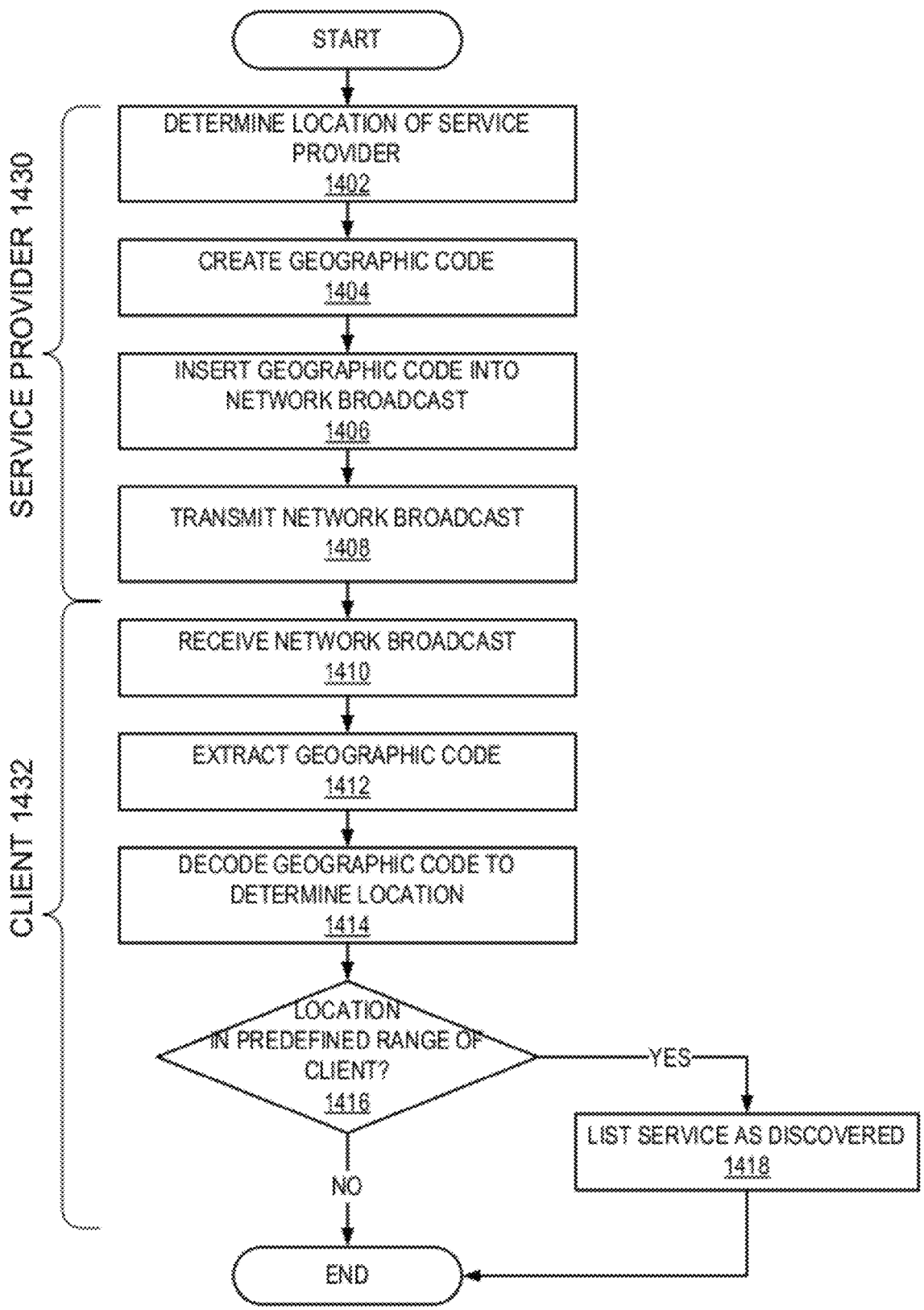
FIG. 14 is a flowchart illustrating an embodiment of a process for discovering network service according to the present invention.

If graphic codes are included in a network service discovery broadcast, then listening devices could determine their own location and decide whether a device is sufficiently close to warrant inclusion in a list of discovered services. Referring now to FIG. 14, a process for discovering a network service according to the present invention will be described. The method begins with a series of operations being performed by a service provider 1430. The service provider 1430 could be any device that offers any type of service over a network such as a peer-to-peer network. In one example described below, a personal computer having a client access the network services offered and provided by a printer, however, the present invention is not limited to printer services only. The method begins by determining 1402 a location of a service provider 1430. This process is similar to that described above with reference to determining the location of an access point. Next, a geographic code is created 1404 for the location determined. Then the geographic code is inserted 1406 into the network broadcast signal generated by the service provider 1430. This process is similar to that described above for inserting the geographic code into the SSID of the access point, but instead inserting the geographic code into a network broadcast signal. Like the beacon signal of the access point, the network broadcast signal is a signal that is repeatedly sent over the network to allow client devices to discover services offered by other device connected to the network. Next, the service provider 1430 transmits 1408 the network service discovery broadcast signal including the geographic code. One or more client devices receive 1410 the network broadcast signal. The method will now be described with regard to a particular client 1432. The client 1432 received 1410 the network broadcast signal. The client 1432 then extracts 1412 the geographic code from the broadcast signal. This process is similar to the locatable device 102 removing the geographic code from the SSID described above. Next the client 1432 decodes 1414 the geographic code to determine the location of the device offering the network service. Next, the method determines 1416 whether the location of the device offering the service is within a predefined range of the client. The predefined range may be dependent on the type of network service being offered. For example, if the network service is a print operation, the range may be limited to a distance that the user is willing to retrieve printed documents such as 100 feet. In another example, a client may advertise that it has the ability to accept scans and include its location as a geographic code. When a multifunction peripheral that produces scans may receive a network broadcast but decide to only show on it display panel those devices within 200 feet as possible destinations for scans. If the PC is within the 200 feet of the multifunction printer it will be displayed as a location, if greater than 200 feet it will not, the network broadcast will be ignored and it will not be possible to deliver scans to that client. For other network services, this predefined range may be greater or smaller. If the location of the device offering the service is determined 1416 not to be within a predefined range, the client 1432 ignores the network broadcast, takes no action and the method is complete. However, if the location is determined 1416 to be within a predefined range of the client 1432, the service is presented 1418 to the user in a list of discovered services. Those skilled in the art will recognize that presentation of the network service in the list in step 1418 is just one of many possibilities. For example, the client 1432 may take any number of different actions to utilize the network service according to default parameters that may have been said previously for this client 1432.

Resource Discovery and Display

Figure 15:
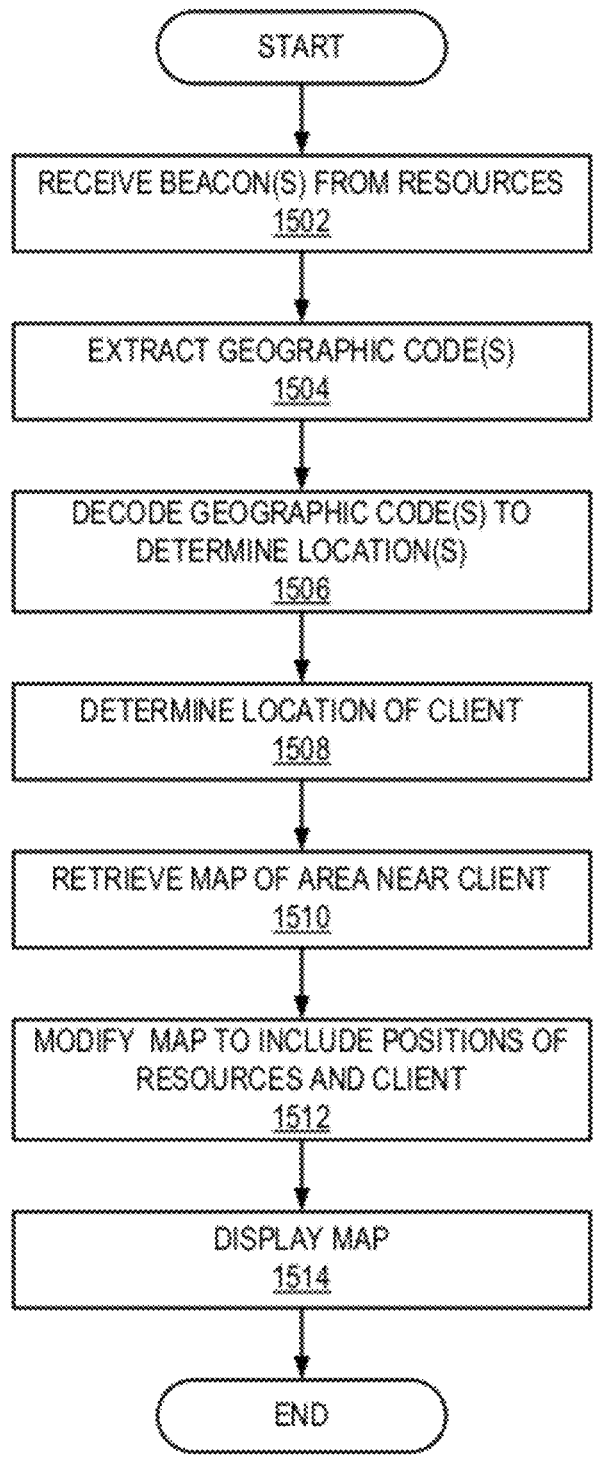
FIG. 15 is a flowchart illustrating an embodiment of a process for discovering and mapping resources according to the present invention.

Referring now to FIG. 15, an embodiment of a process for discovering and mapping resources according to the present invention will be described. Any number of devices of different types may include circuitry to generate a beacon signal that includes a geographic code even though not providing the full communication capabilities provided by traditional wireless network access point. For example, a given area may include a low end personal printer, a high-speed and high-capacity printer, a file server and data storage. Each of these devices might have the capability to generate a beacon signal in accordance with the present invention. The method begins by receiving 1502 a plurality of beacons. In one embodiment, each beacon comes from a different resource. Next the method extracts 1504 the geographic codes from the beacon signals received in step 1502. Then the method decodes 1506 the geographic codes to determine the locations associated with each of the geographic codes. This effectively determines the location associated with each beacon signal. Then the method determines 1508 the location of the client. This can be done using the method described above with reference to FIG. 9 using the received beacons in step 1502. Then the method retrieves 1510 a map of the area near the client. The previous step determined the location and this information can be used along with a conventional mapping program to produce a map of the area near the client. In one embodiment, the location of the client is near the center of the map. In another, the position of client is marked clearly on the map, which has known geographic locations specified for each corner. Next, the method modifies 1512 the map to include positions of the resources for which beacon codes have been received and to include the position of the client. For example, a conventional marker may be used to indicate the position of the client. The positions of the resources are also depicted on the map with a different symbol from the client. Depending on the type of service, a different icon or symbol may be used to represent the different types of resources. Finally, the modified map is displayed 1514. Those skilled in the art will recognize that this method has a number of advantages. First, in a world where devices are becoming increasingly portable, this method could be embodied in a software program offered on laptops and other types of portable computing devices. This would allow the user of the laptop to be positioned in an area and can generate a map of all the resources in its vicinity and their precise location. For example, in a work environment, there are usually several printers on a single floor and dozens of printers in a building. Often the printers are named based on the type of printer or even based on a rough idea of their location ("4th floor laser"). If the printers were also tagged with a geographic code, the printer dialog box could present a map of the client's location along with a precise location of the available printers. It is much simpler to select a printer from a map than to guess where the printer is based on the name. This is very important for mobile printing locations where workers outside of their office may desire to print a document and may not know the location of available printers in an academic or corporate setting. Other types of resources can be discovered in the same manner using geographic coding plus a map application. Second, the map may be used on a periodic basis such as by office staff to track the location of the assets of the business. For example, an office manager may produce a map of an office on a quarterly basis to identify locations of equipment such as photocopiers, printers, computers etc. Their variety of other applications specific to other industries where such a map and auditing function could be valuable such as in a doctor's office, a hospital, a research lab construction sites or other facility where expensive equipment and its location would need to be tracked.

Asset Tracking

Figure 16:
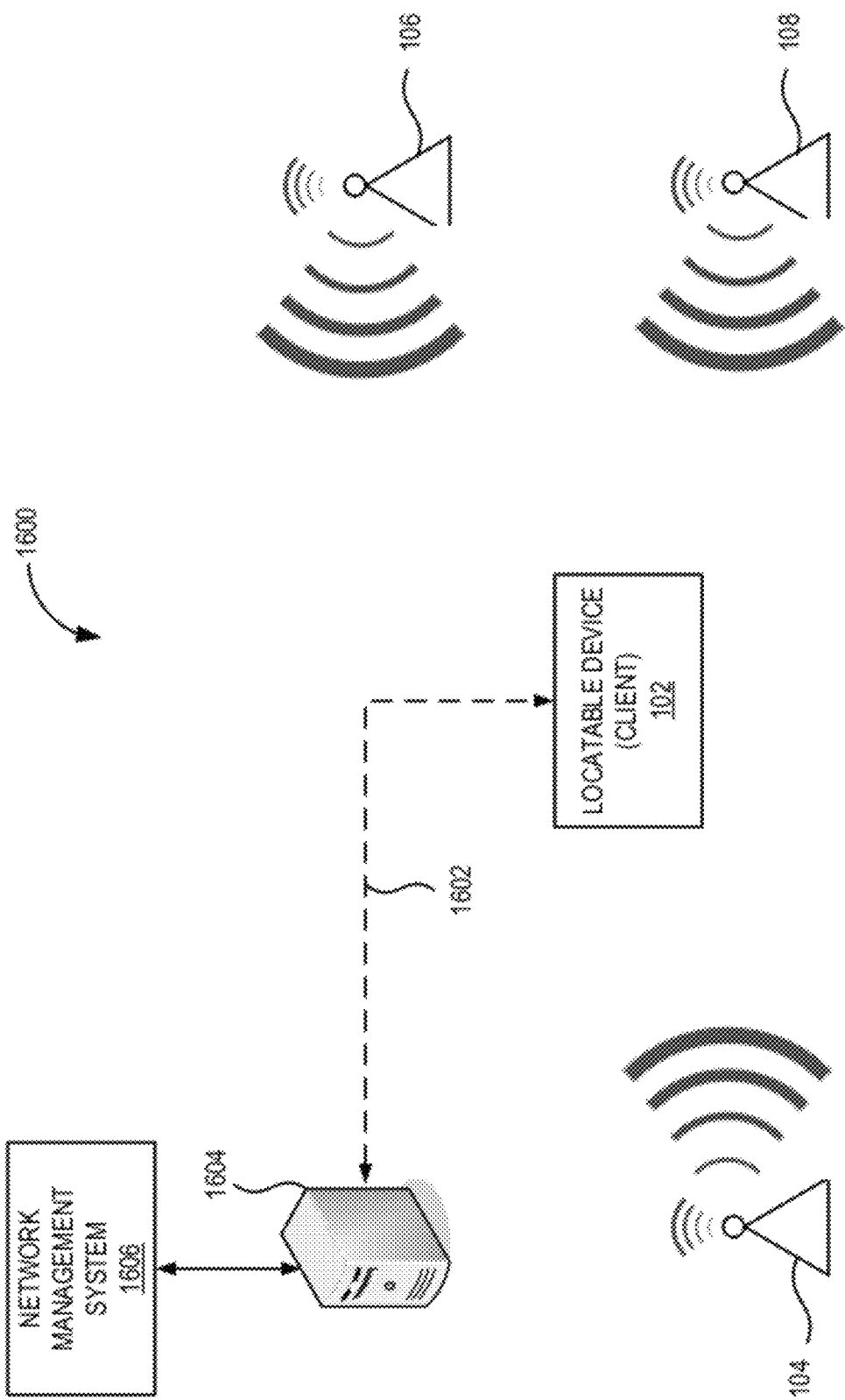
FIG. 16 is a high-level block diagram illustrating an embodiment of a computing system for asset tracking using geographic codes according to the present invention.

Referring now to FIG. 16, an embodiment of a location tracking system 1600 for asset tracking using geographic codes according to the present invention is shown. The location tracking system 1600 includes a number of components similar to those described above for the computing system 100. For convenience and ease of understanding, like reference numbers are used to identify components having the same or similar functionality. In one embodiment, the location tracking system 1600 comprises a locatable device or client device 102, a plurality of network access points 104, 106 and 108, an asset server 1604 and a network management system 1606. The locatable device or client device 102 and the plurality of network access point 104, 106 and 108 have been described above with reference to FIG. 1 so that description will not be repeated here. In an alternate embodiment for asset tracking, very inexpensive tags could be made which can receive WiFi SSID's and calculate the location. If the location is outside of the restricted area, the tag could sound an internal alarm. Since the tag can compute its own location, there is no need to send information to a server. Of course, the tag must be initialized as to where the restricted location such as by using a serial or USB connection to the processor which is part of the tag. The asset server 1604 is a conventional server but also includes an ability to wirelessly communicate with the locatable device 102 via communication channel 1602. Communication with the asset server 1604 may occur using any variety of methods. For instance, the locatable device 102 might passively advertise its location using SNMP protocol, allowing a scanning asset server 1604 to find its location. In an alternate embodiment, it may use Web services protocols such as HTTP, SOAP or XML-RCP to push updated information to the asset server 1604. The asset server 1604 has ability to communicate with other devices and store large amounts of location data. For example, the asset server 1604 will maintain records indicating the current location of a particular locatable device 102 as well as its historical locations. For example, the asset server 1604 maintains a database of locatable device locations. Such an asset server would provide a human readable display, such as a table or graphical map, and allow queries to be generated to locate a particular object, or all objects of a certain class such as a scanner or printer, and display the location of those objects to a human. The asset server might flag certain objects as being located in forbidden locations, or note that previously tracked objects can no longer be found, or note the existence of objects whose characteristics are not yet known. And example of the latter might be an unauthorized desktop printer installed by an employee. The asset server 1604 is adapted for communication with the network management system 1606. The network management system 1606 is coupled to the asset server 1604 to receive and process location information. Network management servers perform many of the functions noted above by asset servers, but also integrate functions to display the status of networked devices. For example, whether a networked device is operational, whether the device has supplies such as paper and ink for continued operation, and usage information such as number of network packets transmitted or number of pages printed. Such a server might also display location information of network resources, or the locations of portable devices connected to the network and which network resources are interacting with the mobile devices. In one embodiment, the network management system 1606 can set boundaries and regions for particular devices, and generate warnings or notifications when the devices are moved outside those boundaries. Those skilled in the art will recognize that the network management system 1606 can be used to provide any number of advanced location processing functions. For example, the network management system 1606 can be used to track a child cell phone, or an employee's badge.

Figure 17:
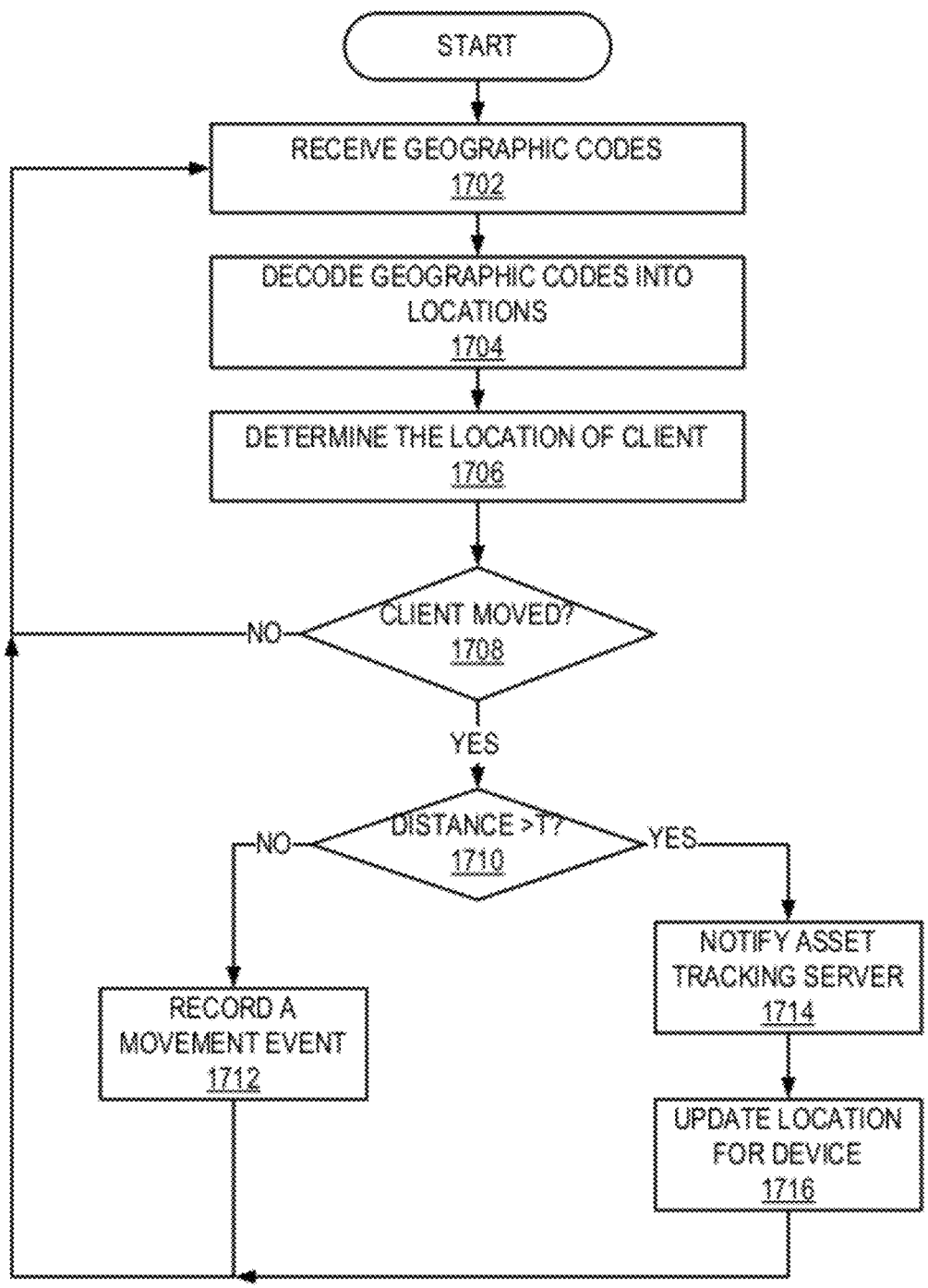
FIG. 17 is a flowchart illustrating an embodiment of a process for asset tracking using geographic codes according to the present invention.

Referring now also to FIG. 17, an embodiment of a method for asset tracking using geographic codes is described. The method begins with a locatable device or client device 102 receiving 1702 one or more geographic codes. The client device 102 then decodes 1704 the geographic codes into locations. Then the client device 102 determines its location. These steps of receiving, decoding and determining can be performed in a manner similar to the methods previously described. The next, the client device 102 determines 1708 whether it has moved. In one embodiment, the client device 102 maintains a buffer listing the locations at which the client device 102 was located for a predetermined amount of time in the past. The location determined in step 1706 compared to the latest entry in this buffer to determine whether the client device 102 is moved. If the client device 102 has not moved, the method returns/loops back to step 1702 to repeat the steps of receiving, decoding and determining described above. On the other hand if the client device 102 has moved, the method calculates a distance between the current location as calculated in step 1706 and the past location of the client device 102 such as might be retrieved from the buffer. The method then determines 1710 whether the distances greater than a predefined threshold. This predefined threshold may be set by an administrator that is responsible for tracking assets. In one embodiment, the threshold may be a distance that would place the client device 102 outside the area of the access points such as 50 feet. In another embodiment, the threshold may be a distance greater than the building in which the asset is located. If the method determined 1710 that the distance is not greater than the threshold, then the method continues in step 1712 to record a movement event after which the method returns to step 1702 to continue to monitor location of the client device 102. In one embodiment, the movement event is recorded only at the client device 102 this minimizes network and conserves the power of the client device 102. In another embodiment, the movement event is also transmitted from the client device 102 to the asset server 1604. In such an embodiment, the asset server 1604 and the network management system 1606 can more precisely monitor the location of the client device 102. If however the distance was determined 1710 to be greater than the threshold, the method continues by notifying 1714 the asset server 1604 that a significant movement event has occurred and the new location of the client device 102 is updated 1716. The new location of the client device 102 may also be stored at the client device 102. Based on the method described above, the asset server 1604 maintains a consistent record of the locations of movement of the client device 102.

File Transfer

Figure 18:
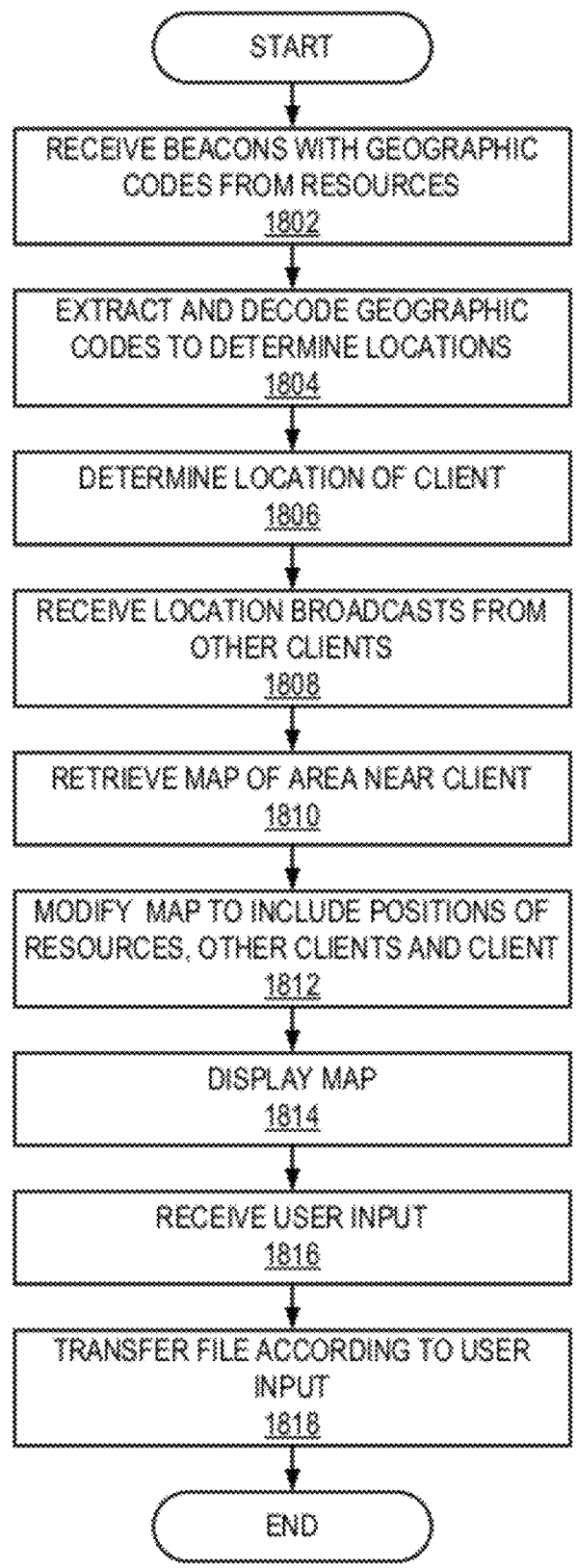
FIG. 18 is a flowchart illustrating an embodiment of a process for using geographic codes for automated file transfer.
Figure 19:
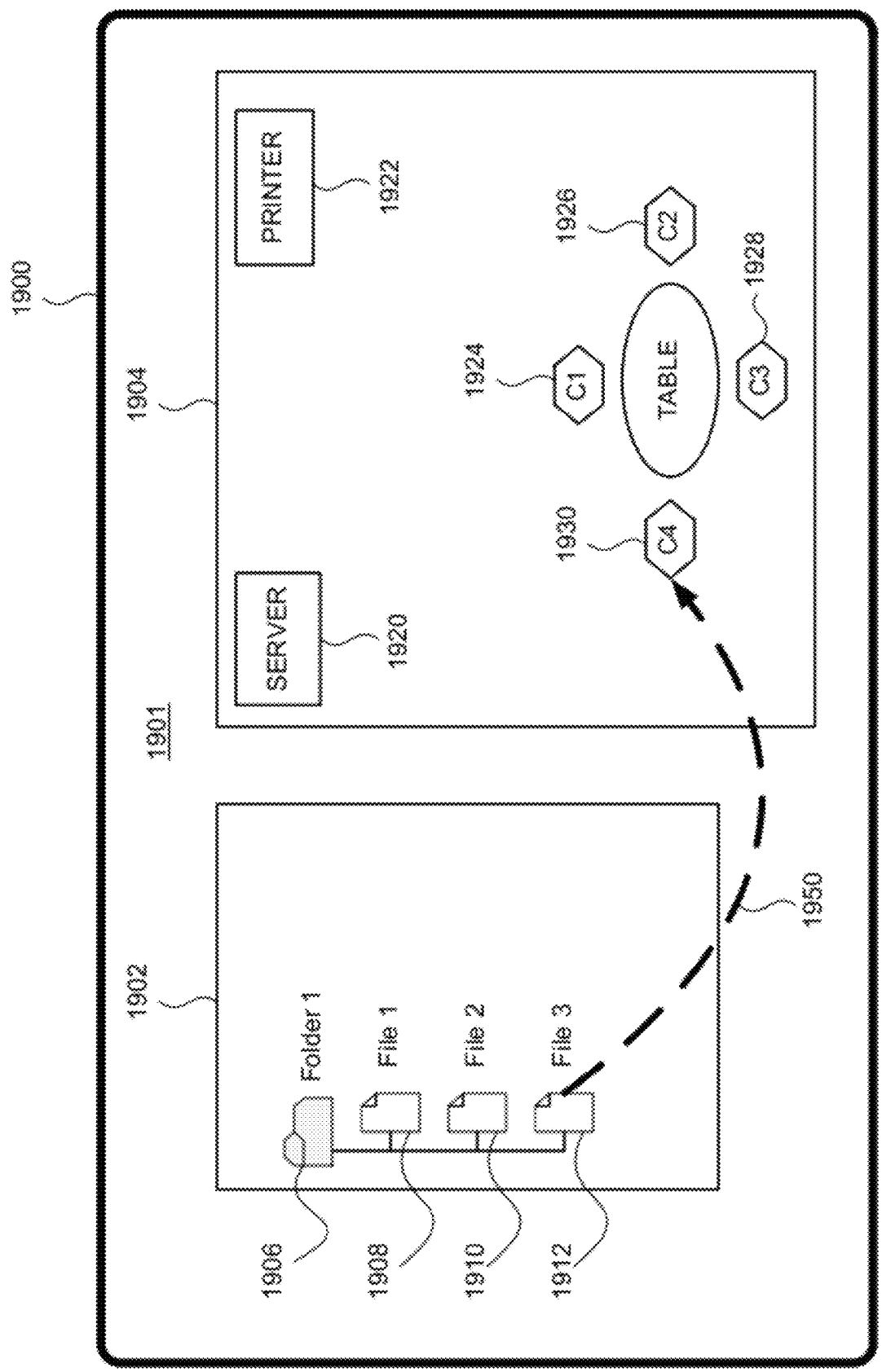
FIG. 19 is a graphical representation of an embodiment of a user interface for automated file transfer according to the present invention.

Referring now to FIGS. 18 and 19, an embodiment of a process for using geographic codes for automated file transfer will be described. FIG. 18 is a flow diagram of the method while FIG. 19 is graphical representation of an example graphic user interface 1901. The method begins by receiving 1802 beacons (or network discovery broadcasts) with geographic codes from resources. For example, a resource may be a printer, a file server, a data storage device, a multi-function peripheral, etc. This method assumes that each of those resources has a geographic code and transmits that code in some manner either via a wireless beacon signal or via a network broadcast signal. In a manner similar to that described above, the client device 102 extracts 1804 and decodes the geographic codes to determine the respective locations of the resources. Using the beacon signals, the client device 102 computes 1806 its location.

In this embodiment, the client device 102 and other client devices have the capability to broadcast signals including a geographic code representing their location. Each client can broadcast their location in a manner that can be received by the other local clients. For example, Apple's "Bonjour" technology or other multicast or broadcast techniques can be used by the clients to notify other clients of their current location. Next, the client device 102 receives 1808 location broadcasts from other clients. In one embodiment, the other client devices send their location as a geographic code. In another embodiment, their location is transmitted as coordinates. In either circumstance, client device 102 uses the location coordinates, converts them to a common coordinate system, or converts the geographic code to a location and use it for the remaining steps of this method. Then the client device 102 retrieves 1810 a map of the area near the client device 102. For example, the client device 102 can use a conventional mapping program along with the location of the client determined in step 1806 to retrieve the appropriate map. Next the method modifies 1812 the retrieved map to include positions of resources, other clients and the client device 102. Next the method displays 1814 the modified map. FIG. 19 shows a graphic representation of a display device 1900 showing one embodiment of an example graphic user interface 1901 of the present invention. In this example, there are four client devices, two resources, namely a server and a printer. As shown in FIG. 19, the graphic user interface 1901 includes a first region 1902 and the second region 1904. In one embodiment, each of these regions 1902, 1904 is a window as conventionally employed in a number of operating systems. The first region 1902 displays a hierarchal file structure including files and folders. In this example, there is a folder 1906 and a plurality of files 1908, 1910 and 1912. The second region displays 1904 the modified map generated in step 1812 above. In this example, the locations of the resources specifically the server 1920 and the printer 1922 are depicted in their relative location compared to the client device 102, C1 1924. Other clients C2 1926, C3 1928 and C4 1930 are displayed on the map according to the position broadcast by them. In one embodiment similar to that shown in FIG. 19, the resources are represented by it for shape, a rectangle, while the clients are represented by a second different shape, a hexagon so that they may easily be differentiated by the user. Those skilled in the art will recognize that be shapes are used merely by way of example and that various other shapes our icons are symbols may be used in their place.

The method continues by receiving 1816 user input, and then transferring 1818 files according to the user input. Those skilled in the art will recognize that file transfer is used only by way of example and that a variety of other actions between two clients or between a client and resource may be performed using the graphic interface in 1901 depicted in FIG. 19. FIG. 19 shows by way of example an arrow 1950 that represents the user clicking on file three 1912 and dragging it over the icon for the fourth client, C4 1930. In response to this input, file three would be transferred from the first client device, C1 1924, to the fourth client, C4 1930. This method and graphic user interface 1901 advantageously allow a user to choose the recipient (person or device) graphically—for instance by selecting the person based on their position around the table. Similarly, the user may cause a file or document to be printed by dragging it and drop unit over the icon 1922 representing the printer or stored/transferred by dragging and dropping it over the server 1920. Although not shown, an area on the map or graphic user interface 1901 could be designated as a place to share the document with all the other computing devices. Alternatively, a number of devices could be selected by dragging across the map or graphic user interface 1901 and then when the document is dropped on one of the selected devices; it could be shared with all of the selected devices and not with any other non-selected devices. Note that using the map technique, the name of the computer or printer is not required—the location is enough. The drag and drop technique could be coupled with an encrypted distribution method where all documents are shared with all devices in range in encrypted form in advance and only the decryption key is exchanged when document is dropped on the receiving computer.

Location Tracking

Figure 20:
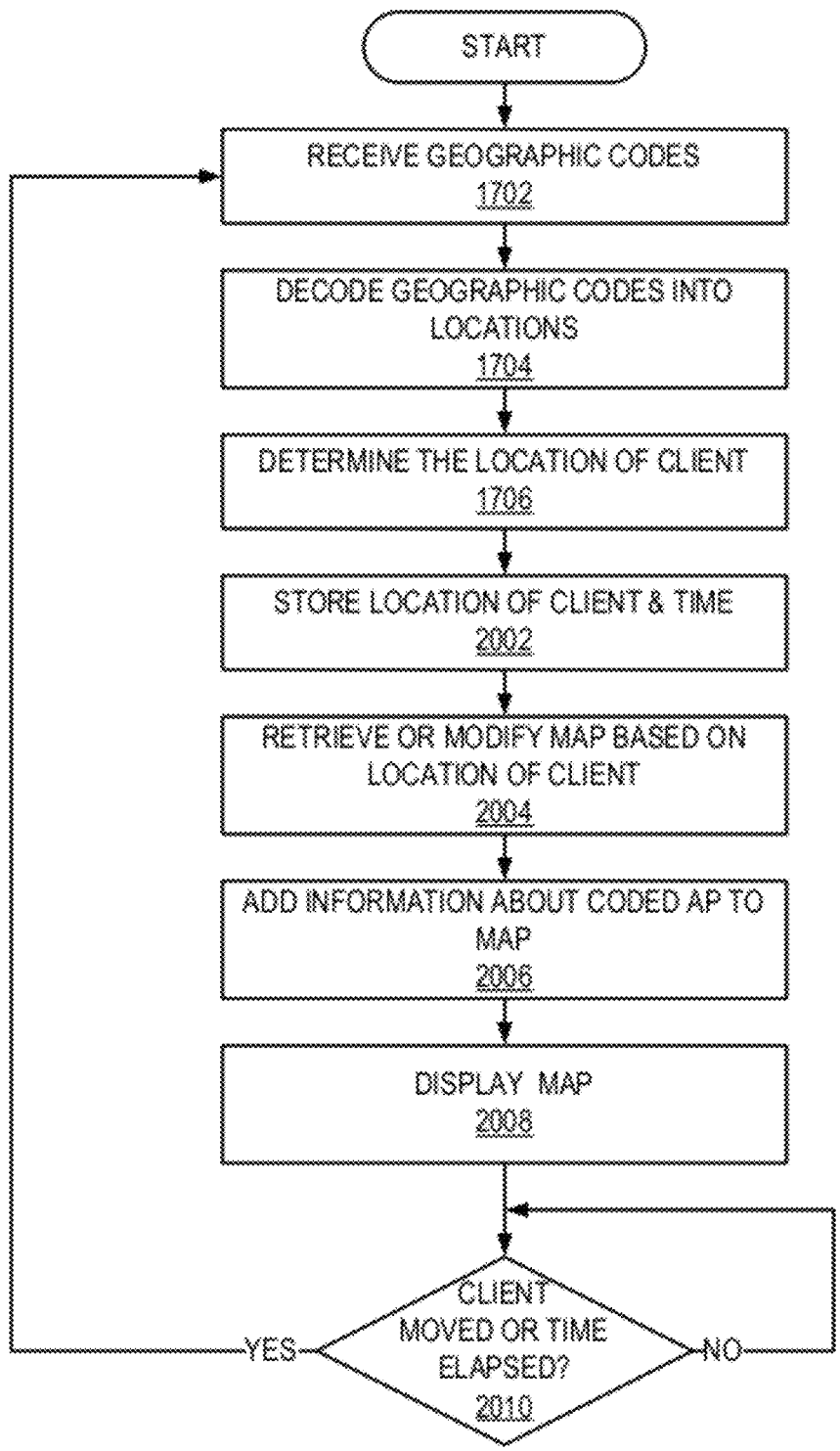
FIG. 20 is a flowchart illustrating an embodiment of a process for location tracking and recording according to the present invention.

Referring now to FIG. 20, an embodiment of a process for location tracking and recording according to the present invention is described. The method begins by receiving 1702 geographic codes, the decoding 1704 geographic codes into locations and determining 1706 the location of the client device 102 similar to other methods as has been described above. Next, the method stores 2002 the location of the client device 102 and the time. In one embodiment, this is performed by storing the information locally at the client device 102. In another embodiment, this is performed by sending the information to another device such as the asset server 1604 and storing it there. Next the method retrieves 2004 a map based on location of the client device 102. In the event a map is already being displayed, this step modifies 2004 the map based on the location of the client device 102. For example, the modification may be to keep the map with the location from step 1706 at the center. Then the method adds 2006 information about access points that have a geographic code in their beacon signal. For example, the map can be modified to include icons showing the locations of the access points for which beacon signals have been received. The map is then displayed 2008 by the client device 102 to the user. The client device 102 continues to monitor and detect additional beacon signals. The client device 102 determines 2010 whether the client device has moved or whether a predetermined amount of time has elapsed. If either of these conditions has occurred, the method loops back to step 1702 to gather more information and repeat the process for updating the map. If he these conditions have occurred, the method loops back and mongers for additional beacon signals. This method allows the automatic tracking and recording of where a client device 102 has traveled. The stored information can then be used to generate a trip report or way to get directions back to somewhere would be very valuable.

In another embodiment, the above method can be combined with a PlaceStamp. A PlaceStamp is made by entangling hash chained logs located on a device at a fixed geographic code, and one on a mobile device. By performing this sort of entanglement, a mobile device can prove it was at a location at a particular time, and the fixed location device can prove that it was not moved or in a different location. By entangling these logs with other sensors, like accelerometers and GPS receivers, the present invention can be used to provide a very strong proof of location. These proofs might be used for legal purposes, or military tracking. Alternatively, they might be used to pass out coupons for attendance at particular events In yet another embodiment, the client device 102 can maintain a map of access points that have been seen and those that have been registered. The registered access points might include data about the access point, including which business owns the access point or whether or not the access point is open. The client device 102 may find its location by asking the user or from a geographically-coded closed access point. From that starting position, the client might determine that moving 2 blocks north would put the client device 102 within range of an open access point or take the person to a cafe or library. Access points could be registered along with their geographic codes on a server which could then make that database available to geographic code clients.

Registry—DNS

Figure 21:
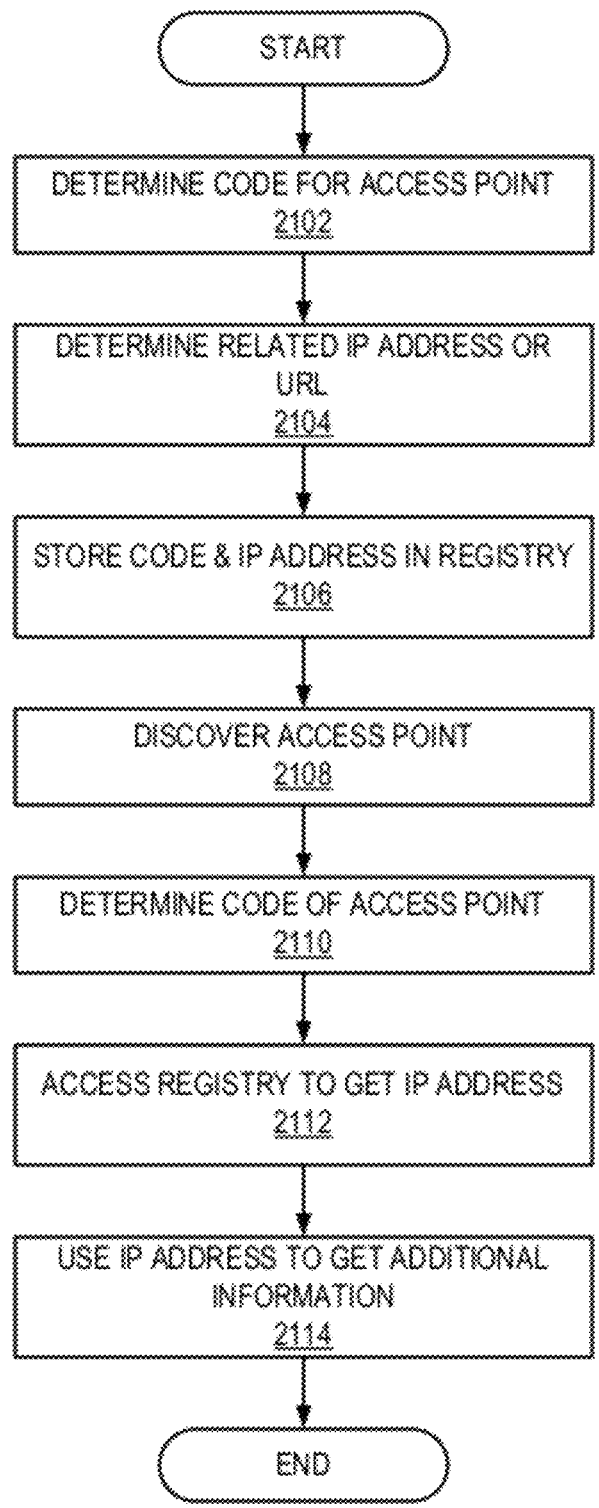
FIG. 21 is a flowchart illustrating an embodiment of a process for using geographic codes as part of a registry according to the present invention.

Referring now to FIG. 21, an embodiment of a process for using geographic codes as part of a registry according to the present invention is described. Each geographic code covers a very small area. In the Menlo Park, Calif. area, the coverage of one code is approximately 2 feet by 3 feet or so. There are 60^8*256 possible unique geographic codes (approx. 4×10^56). This guarantees that each access point will have a unique code. A registry is provided to link a given IP address or URL to each access point. For instance, when someone registers an access point, they could also indicate which IP address or URL that access point should reference. If another client discovers an access point and the associated geographic code, they could look up the business that owns that access point. The method for providing such functionality begins by determining 2102 the geographic code for an access point. Then the method determines 2104 a related IP address or URL. The geographic code and the IP address are then stored 2106 in the registry. Once he steps have been completed registration process is complete. Then a client device 102 discovers 2108 an access point and determines 2110 the geographic code for the access point from its beacon signal. Using the geographic code extracted from the SSID of the beacon signal, the client device can access 2112 the registry and retrieve an IP address. In one embodiment, the client device 102 could go to web address: http://[tag].geofi.net/ where [tag] is the geographic code and the Domain Name Service (DNS) could respond with the IP address that was registered. In another embodiment, a client device 102 could access the link on a Web server between http://geofi.net/[tag] and the URL of the registered site. Since geographic codes can include upper and lower case characters according to the encoding scheme described above, it will be necessary to modify the geographic codes slightly to use it with DNS. For example, the lowercase characters can be prefixed with an hyphen. Thus, an example geographic code "8OuqccVQj" would be written as "8O-U-Q-C-CVQ-J". Valid URLs could be: "http://8O-U-Q-C-CVQ-J.GeoFi.org/" or "ftp://ftp.8O-U-Q-C-CVQ-J.GeoFi.org/". Once the IP address has been used to access the registry, it can be used 2114 to get additional information in a conventional manner such as through a web browser.

Automatic Geographic Code Setting

Figure 22:
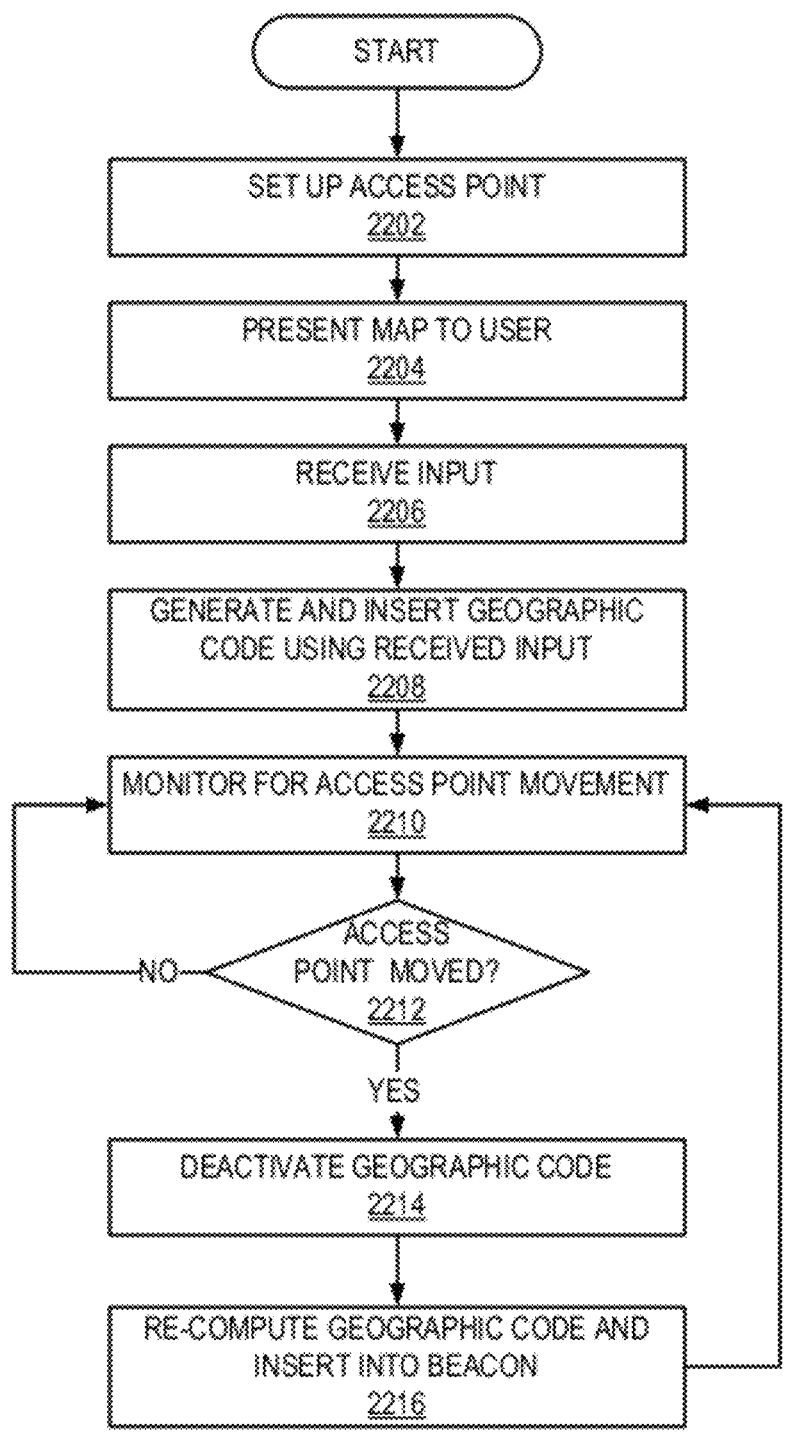
FIG. 22 is a flowchart illustrating an embodiment of a process for setting geographic codes according to the present invention.

Referring now to FIG. 22, an embodiment of a process for automatically setting geographic codes according to the present invention is described. For full utilization of this method, it is assumed that the access point incorporates additional sensors such as an accelerometer, compass, etc. for detecting movement of the access point. The process begins by setting 2202 up the access point. Access points usually come with some type of setup application. Sometimes this is a normal executable file and sometimes the setup is done using a web application over an http connection. In one embodiment, the set up is modified to present 2204 a map to the user. The map may be based upon location information from the included GPS sensor or other component that provides the access point with location information. In one embodiment, access point device could communicate via USB or bluetooth with a GPS unit to determine this location. Such communication protocols are standard. Many GPS devices sold today include some communication protocol. In other words, an access point that hasn't been coded could harvest GPS data from GPS+bluetooth or GPS+WiFi devices. In other words, if an access point doesn't know where it is, but sees a bluetooth or WiFi device that does know, it could update its location based on the device. The user then inputs a selection about the location of the access point that is received 2206 at the access point. Next, the access point generates and inserts 2208 a geographic code based on the input received. The method monitors 2210 for movement of the access point. Since the access point includes an accelerometer, any movement of the access point can be detected. Next, method determines 2212 whether the access point has moved. If not, the method returns to step 2210 to monitor for access point movement. However, if the access point is moved the method continues by deactivating 2214 the geographic code. In one embodiment, the geographic code is effectively "turned off" by removing the code from the SSID signal of the access point. In another embodiment, the geographic code is also removed from the SSID signal of the access point if the access point loses power. Then the method re-computes 2216 the geographic code and inserts it into the SSID for the access point. In one embodiment, the access point includes a compass as well as an accelerometer, so that the access point can re-compute its geographic code when it's moved for short distances. After the completion of step 2216, the method returns to step 2210 to monitor for additional movement of the access point.

Other Applications

Location-based Superdistribution. Superdistribution is a technique of putting documents in locations in advance of when they are needed. Documents can be pushed to servers where people have indicated an interest in those types of documents. A server to receive documents can publish its existence via geographic code on a web site. When a document is read or modified, it is associated with the current geographic location and updates can be routed automatically to the associated server. The GeoFi.org web site can pass out IP subdomains for local servers as something like. [tag] .GeoFi.org as a domain.

Web service—convenience. Businesses can include geographic codes in their web sites so that when a user goes to a web site, it is possible to determine where the business is located. RSS feeds can also include geographic codes. For news sites, the geographic code might indicate where the story occurred. For blogs, the geographic code could indicate where the blog entry was written or the location that the entry is about. The geographic codes make convenient tags for any application that allows tags: blogs, photo-sharing services like Flikr, and so on.

Geographic Code-based mesh routing. Geographic codes attached to access points gives much more information to a global route optimization program, providing it with good ideas about which mesh nodes might be available and what is the shortest physical path to route packets across the network. This could be particularly advantageous for extremely time critical applications like control systems.

Sensor fusion. When a device has a combination of sensors, including accelerometers, WiFi electronics, a compass, a clock, and/or a GPS receiver, geo-location information can be more accurate and when one fails (for instance if no geographic-coded access points are nearby) the device can fall back on another sensor. This might be especially useful for a device intended to be used both indoor and outdoor. Geographic codes can be used indoors and GPS can take over when the device roams outside.

Social networking applications. There are several new businesses like Loopt that have sprung up connecting people with their friends based on location. Loopt uses cell phone technology—tower triangulation and GPS—to notify users when their friends are nearby. Each person's location is sent regularly to a server. When friends are near each other, they can be notified so that they can get together.

Self-Labeling of Access Points

Figure 23:
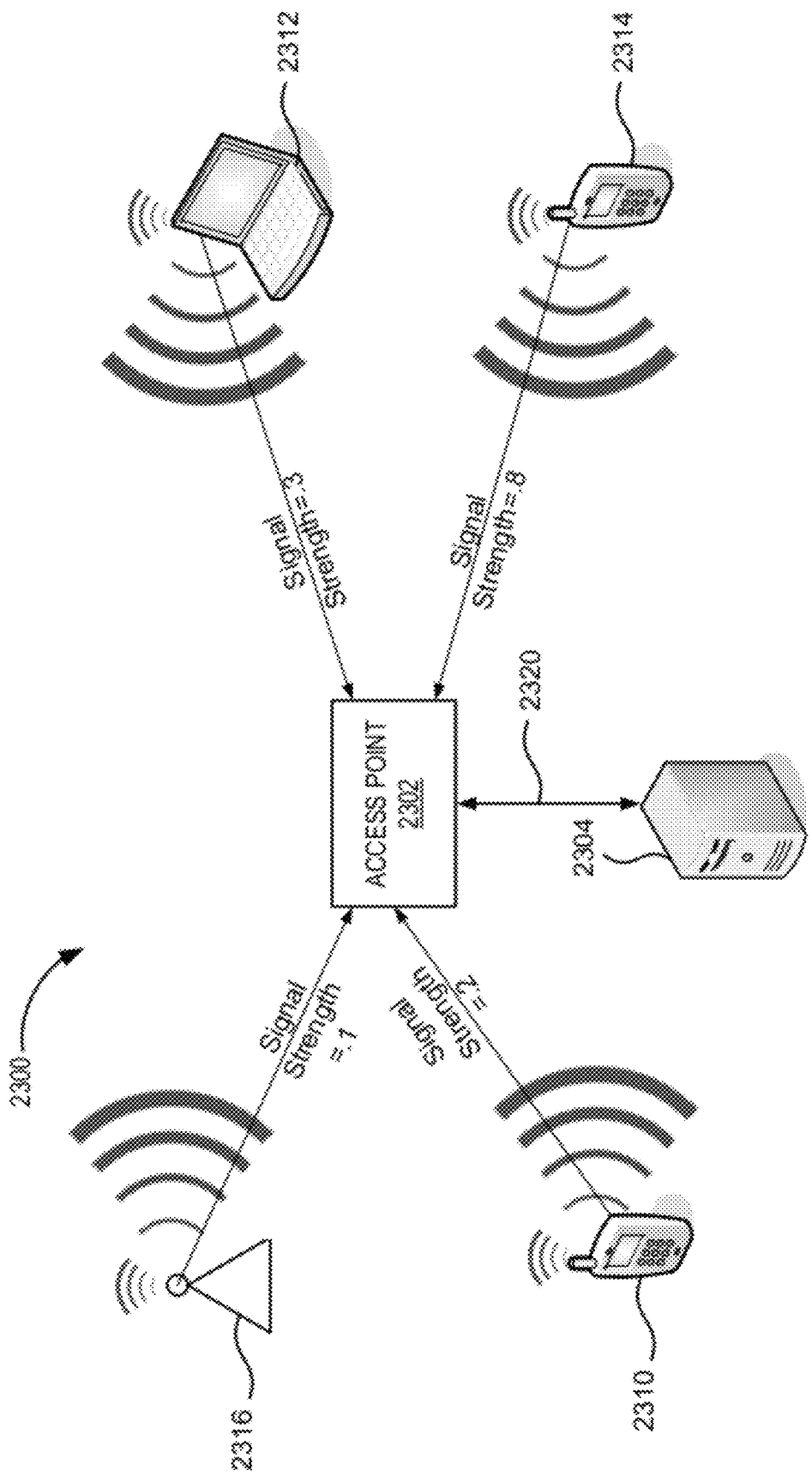
FIG. 23 is a high-level block diagram illustrating an embodiment of a computing system including a self labeling access point according to the present invention.

Referring now to FIG. 23, one embodiment of a computing system 2300 including a self labeling access point 2302 according to the present invention is shown. The system 2300 comprises: a first access point 2302, a server 2304, a plurality of mobile devices 2310, 2312 and 2314 and a second access point 2316. The first access point 2302, plurality of mobile devices 2310, 2312 and 2314 and the second access point 2316 are adapted for wireless communication such as using WiFi. The first access point 2320 is also coupled by signal line 2302 to the server 2304. Those skilled in the art will recognize that the computing system 2300 may include any number of access points and mobile devices wirelessly coupled to the first access point 2302 even though FIG. 23 only shows the second access point 2316 and three mobile devices 2310, 2312 and 2314.

In the present invention, mobile devices 2310, 2312 and 2314 take location information from GPS or similar location technology, and then generate beacon frames including geographic location codes at relatively slow intervals. A normal access point, such as the second access point 2316, broadcasts ten beacon frames per second, but the mobile devices 2310, 2312 and 2314 generate a beacon frame once every minute. The first access point 2302 can expect to receive a broadcast frame from the mobile devices 2310, 2312 and 2314 occasionally and can accumulate an estimate of its location over time. In one embodiment, the broadcast of such beacon frames with location information can come from any direction and overtime a weighted average of broadcast locations heard by the first access point 2302 provide a good estimate of its position. In some cases, such an estimate is more accurate than a hand labeled location depending on the pattern of motion of nearby mobile devices 2310, 2312 and 2314. The first access point 2302 listens for frames over time, attempting to accumulate a sufficient number signals to get good positional accuracy. Once an appropriate number of signals is obtained, the first access point 2302 can label itself based on the accumulated signal information it has heard that.

The first and second access points 2302, 2316 are of a conventional type but also include the present invention. The first and second access points 2302, 2316 are devices that allow wireless communication devices to connect to a wireless network (shown generally as 2320). Although not shown in FIG. 23, access points 2302, 2316 include an antenna, RF transceiver, a controller, read-only memory, random access memory as shown in FIG. 27. The first access point 2302 also includes a self labeling module that implements the process of the present invention described below with reference to FIGS. 25 and 26. While the second access point 2316 is assumed to be a self labeling access point as well, those skilled in the art will recognize that the second access point 2316 could be a conventional access point without the ability to self label. Furthermore, the second access point 2316 is representative of any number of the access points that may be within wireless communication range of the first access point 2302.

The plurality of mobile devices 2310, 2312 and 2314 may be any type of conventional mobile computing device such as a smart phone, cell phone, a laptop computer, a personal digital assistant, etc. The mobile devices 2310, 2312 and 2314 also include a module for identifying location and transmitting it is part of the beacon frame. The operation of the mobile devices 2310, 2312 and 2314, in particular, a location identifying and transmitting module are described in more detail below with reference to FIG. 24. In one embodiment, the mobile devices 2310, 2312 and 2314 include some type of location determining device such as a GPS receiver. In another embodiment, the mobile devices 2310, 2312 and 2314 are adapted for wireless communication and can determine their location by triangulation of received wireless signal.

The server 2304 is a conventional type and is coupled to the first access point by signal line 2320.

Figure 24:
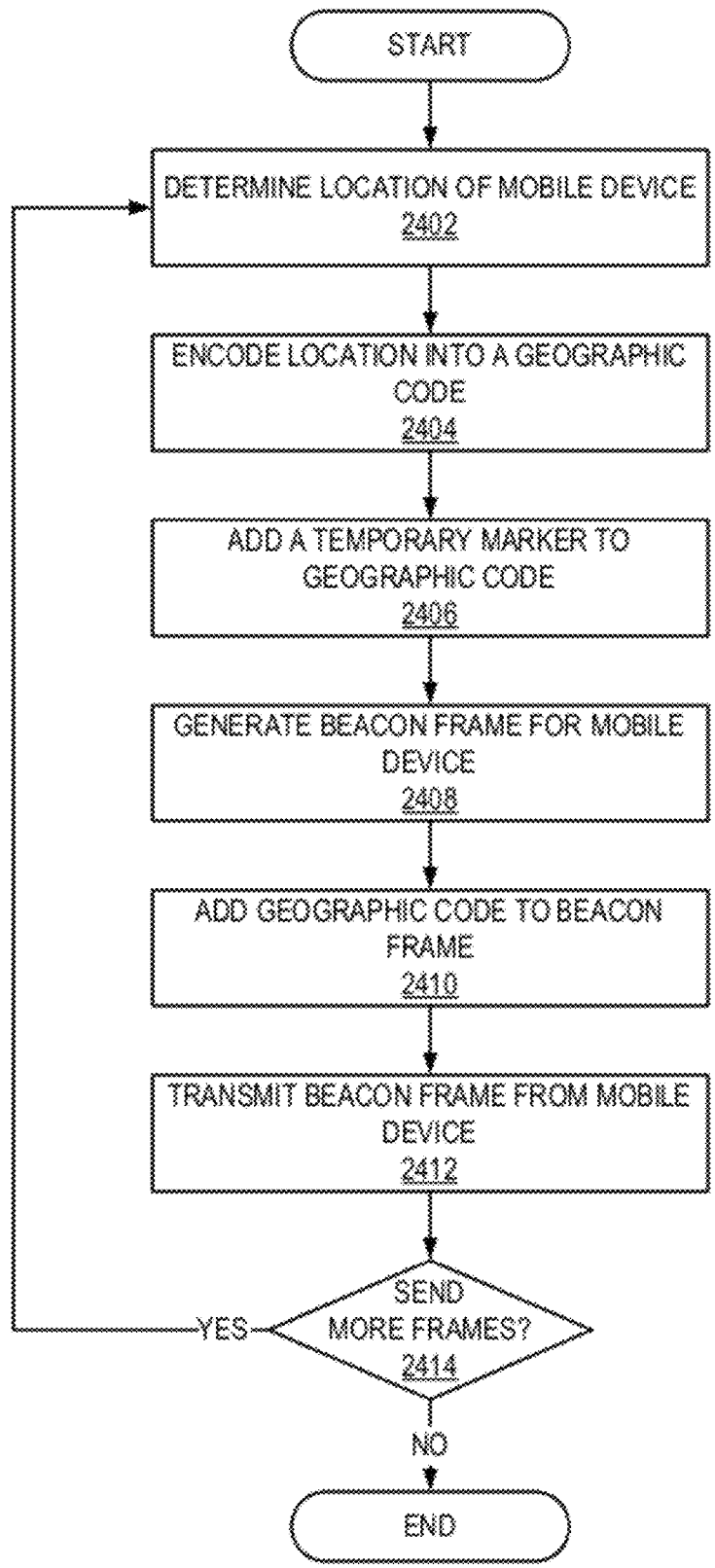
FIG. 24 is a flowchart illustrating an embodiment of a process for geographic tagging and transmission of beacon frames by mobile devices according to the present invention.

FIG. 24 is a flowchart illustrating an embodiment of a process for geographic tagging and transmission of beacon frames by mobile devices 2310, 2312 and 2314 according to the present invention. This process is run on any of the mobile devices 2310, 2312 and 2314 as well as any others that may be in range of the access point 2302. In the description that follows, the process is described as running on mobile device 2310 by way of example, however, it should be understood that this process is running on any number of the mobile devices 2310, 2312 and 2314.

The method begins by determining 2402 the location of a mobile device 2310. In one embodiment, the mobile device 2310 includes a GPS receiver (not shown). The GPS receiver can be used to determine the location of the mobile device 2310. This is done in a conventional manner for GPS receivers as understood by those skilled in the art. In another embodiment, the mobile device 2310 can determine its location by receiving beacon frames from other devices (primarily fixed access points but alternatively, a combination of other mobile devices and access points), determining the location of the other devices, and computing its location through triangulation as was described above with reference to FIGS. 2 and 9. Next, the method encodes 2404 at the mobile device 2310 the location of the mobile device 2310 into a geographic code. Once location of the mobile device 2310 is known, this process is similar to that described above with reference to FIGS. 5 and 7. For example, a geographic code for the mobile device 2310 may be a string like "Piersol 8OuqccVJq," where "Piersol" is the name of the device and "8OuqccVJq" is the geographic code. Then the method adds 2406 a temporary marker to the geographic code. For example, "Piersol" is replaced with ".geofitemp." so that the geographic code is the string ".geofitemp.8OuqccVJq." This marker allows recipients of the beacon frame to identify the location information as temporary and from a mobile device 2310. Then the method generates 2408 a beacon frame for the mobile device 2310. As has been described above with reference to FIG. 3, the geographic code is added 2410 to beacon frame as the last characters of the SSID field. In an alternate embodiment, the geographic code and temporary marker are separately added into the beacon frame as part of the SSID field. Then the method broadcasts or transmits 2412 the beacon frame from the mobile device 2310. It should be understood that in contrast to a fixed access point then generates and transmits a beacon frame more than 10 times per second, the mobile device 2310 will generate a beacon frame including the geographic location only occasionally, for example, as infrequently as once a minute or once every several minutes. This is particularly advantageous because the mobile devices 2310 have limited power and continually generating and sending beacon frames consumes too much of their power. Finally, the method determines 2414 whether more frames should be sent that include the geographic location of the mobile device 2310. This process is generally but not always a simple infinite loop. However, placing the device into "airplane mode" where transmissions should be restricted should also disable beacon frame generation. If so, the method returns to step 2402 and repeats the process described above. If not however, the method is complete and ends.

Figure 25:
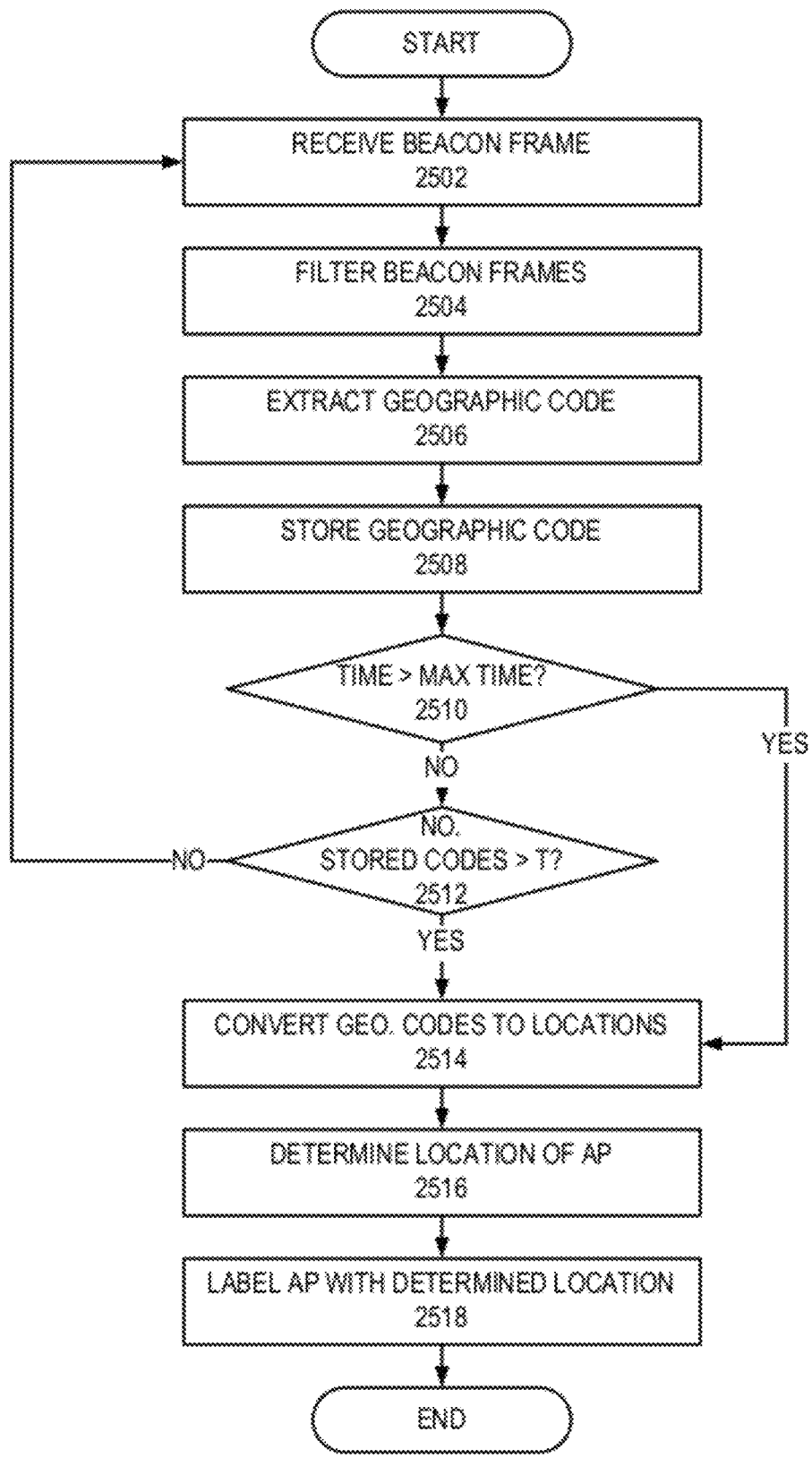
FIG. 25 is a flowchart illustrating an embodiment of a process for a self-labeling an access point according to the present invention.

Referring now to FIG. 25, an embodiment of a process for self-labeling the first access point 2302 according to the present invention will be described. The method begins by receiving 2502 a beacon frame. Next the method filters 2504 the beacon frame. There are a number of circumstances in which a particular beacon frame should be disregarded and ignored. For example, for the fixed access points 2316 that are sending many beacon frames per second, many of the beacon frames can be ignored so that only one beacon frame is utilized per a predefined amount of time, such as one or more minutes. In other words, the present invention filters beacon frames from the fixed access points 2316 so that the number of beacon frames received is about comparable with the number of beacon frame that can be expected from a mobile device 2310. Furthermore, the beacon frames may be filtered to avoid a malicious flooding attack where an attacker generates a flood of mislabeled beacon frames to prevent use of geographic coding in a particular area, or to cause the first access point 2302 to be mislabeled. For various other reasons, a particular beacon frame may be filtered 2504 and not used in the self labeling process. One embodiment for a filtering method will be described below with reference to FIG. 26. After the beacon frames have been filtered 2504, the method continues to extract 2506 the geographic code from the beacon frame. This process is similar to that described above with reference to FIG. 4. Then the method stores 2508 the extracted geographic code for future use in the self labeling process. In one embodiment, in addition to the geographic code, the amplitude of the beacon frame signal received by the first access point 2302 is also stored. Next the method determines whether an amount of time has elapsed since the location of the first access point 2302 has been calculated. In this embodiment, after a predetermined amount of time, maximum time, has elapsed, the method attempts to calculate the geographic location of the first access point 2302 and label it. In one embodiment, maximum time is 12 hours. In another embodiment, maximum time to 24 hours. This ensures that the first access point 2302 has its location continually updated. If the amount of time elapsed since the location of the first access point 2302 was calculated is greater than the maximum time, the method continues in step 2514 to recalculate the position of the first access point 2302. On the other hand, if the amount elapsed since the location of the first access point 2302 was calculated is not greater than the maximum time, the method continues to determine 2512 whether the number of geographic codes detected as a part the filtered beacon frames stored is greater than a preset threshold, T. In one embodiment, the present invention requires that the number of geographic codes used to determine the location of the first access point 2302 must be greater than the preset threshold, T. This ensures that the number of geographic codes necessary to reliably calculate a position of the first access point 2302 has been received. In one embodiment, the preset threshold is 100. In another embodiment, the preset threshold is 1000. If number of stored codes is not greater than the threshold, the method returns to step 2502 to receive additional beacon frames and repeats steps 2504 to 2512. If the number of stored codes is greater than the threshold, the method proceeds to step 2514 to determine the location for the first access point 2302.

In step 2514, the method converts the geographic codes to locations. Then the method determines 2516 the location of the first access point 2302. For example, the location can be determined using a process similar to that described above with reference to FIG. 9. However, this step has increased complexity as compared with the process of FIG. 9 as there may be anywhere from three to thousands of locations and amplitudes from which to calculate geometric center. In more complex embodiments, the calculation notes the distribution of stored locations, and determines the location based on an estimate of the shape of the distribution. For example, an "L" shaped distribution could indicate that the device is probably at the corner of a building, and adjust its estimate towards the corner of the building. In one embodiment, the first access point 2310 sets it location to the determined location. Finally, the method uses the calculated location and self labels 2518 the first access point 2310. For example, this can be done by using a process similar to that described above with reference to FIGS. 4, 5 and 7.

Figure 26:
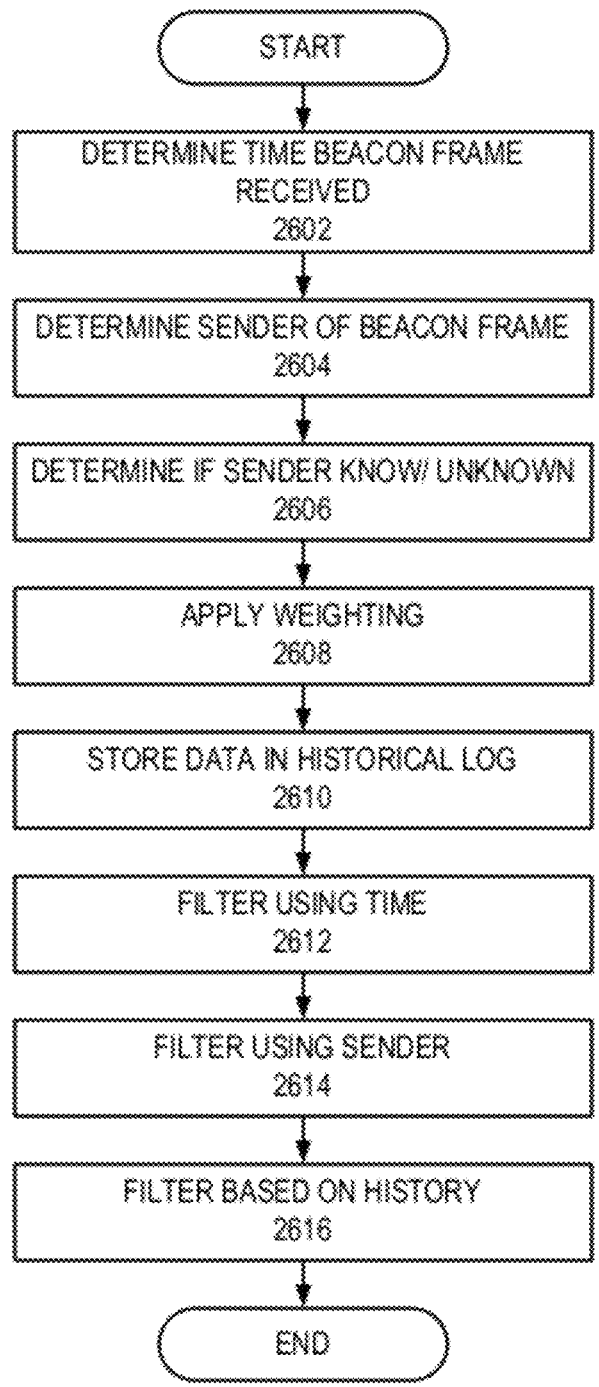
FIG. 26 is a flowchart illustrating an embodiment of method for filtering beacon frames for self-labeling according to the present invention.

Referring now to FIG. 26, an embodiment of a method for filtering beacon frames for self-labeling according to the present invention is described. While the method described below with reference to FIG. 26 filters the beacon frame for a variety of different criteria, those skilled in the art will recognize that selected steps of FIG. 26 may be used without the other steps to filter out beacon frame for a particular criterion rather than all the criteria used in FIG. 26. The method begins by determining 2602 a time that the beacon frame was received. Next, the method determines 2604 the sender of the beacon frame. In one embodiment, the sender is determined by identifying the MAC address in the header of the beacon frame. Then the method determines 2606 whether the sender is known or unknown. For example, the access point 2302 maintains a log of MAC addresses for senders that are known. In another embodiment, the access point 2302 maintains a log of MAC addresses from which more than a predetermined number of beacon frames have been received. Then, the method applies 2608 a weighting if many signals have been received from the same device in a short period of time, thereby limiting the effect of any single malicious device. Next, the method stores 2610 the data in a historical log. Then the method filters 2612 the beacon frame based on time. For example, to prevent the malicious flooding of packets, the first access point 2302 may have a new beacon frame location only once every minute. Then the method filters 2614 the beacon frame based on the sender. For example, the first access point 2302 may accept only one location signal from any given generating device, based on it MAC address. Then the method filters 2616 the beacon frame based on the history, such as data stored in the historical log. Those skilled in the art will recognize that time, sender and history are three criteria used only by way of example and that various other criteria may be used to filter the beacon frame.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A method for generating a geographic code, the method comprising:
retrieving and displaying a map to a user;
receiving input from the user;
generating a geographic code based on the input from the user;
inserting the geographic code in an SSID of a beacon of an access point;
monitoring the access point for movement;
determining whether the access point has moved; and
in response to determining that the access point has moved, deactivating the geographic code by removing the geographic code from the SSID of the beacon of the access point.

2. The method of claim 1, wherein retrieving and displaying the map to the user is part of setting up the access point.

3. The method of claim 1, wherein generating the geographic code based on the input from the user includes encoding a latitude and a longitude of the access point into a defined number of characters.

4. The method of claim 1, wherein in response to determining that the access point has moved:
re-computing a geographic code; and
inserting the re-computed geographic code in the SSID of the beacon of the access point.

5. The method of claim 1, further comprising:
retrieving a request for the geographic code;
displaying a graphical user interface;
wherein retrieving and displaying the map to the user comprises displaying the map in the user interface;
wherein receiving input from the user includes receiving an address;
converting the address to coordinates for a location;
wherein generating the geographic code based on the input from the user includes creating the geographic code from the coordinates for the location; and
outputting the geographic code.

6. The method of claim 5, wherein the geographic code is output by displaying, in the graphical user interface, the geographic code in a comment box and an input address mark on the map near the location.

7. A system comprising:
a graphical user interface configured to display a map to a user;
an input device configured to receive input from the user;
one or more processors configured to:
generate a geographic code based on the input from the user;
insert the geographic code in an SSID of a beacon of an access point;
monitor the access point for movement;
determine whether the access point has moved; and
in response to determining that the access point has moved, deactivate the geographic code by removing the geographic code from the SSID of the beacon of the access point.

8. The system of claim 7, wherein displaying the map to the user is part of setting up the access point.

9. The system of claim 7, wherein the one or more processors are configured to generate the geographic code based on the input from the user by encoding a latitude and a longitude of the access point into a defined number of characters.

10. The system of claim 7, wherein, in response to determining that the access point has moved, the one or more processors are configured to:
re-compute a geographic code; and
insert the re-computed geographic code in the SSID of the beacon of the access point.

11. The system of claim 7, wherein the one or more processors are configured to:
retrieve a request for the geographic code;
receive input from the user including an address via the input device;
convert the address to coordinates for a location;
generate the geographic code using the coordinates for the location; and
output the geographic code.

12. The system of claim 11, wherein the graphical user interface is configured to display the geographic code in a comment box and an input address mark on the map near the location.

13. A computer program product comprising a non-transitory computer useable medium including a computer-readable program, wherein the computer-readable program when executed on a computer causes the computer to:
retrieve and display a map to a user;
receive input from the user;
generate a geographic code based on the input from the user;
insert the geographic code in an SSID of a beacon of an access point;
monitor the access point for movement;
determine whether the access point has moved; and
in response to determining that the access point has moved, deactivate the geographic code by removing the geographic code from the SSID of the beacon of the access point.

14. The computer program product of claim 13, wherein retrieving and displaying the map to the user is part of setting up the access point.

15. The computer program product of claim 13, wherein the instructions cause the computer to generate the geographic code based on the input from the user by encoding a latitude and a longitude of the access point into a defined number of characters.

16. The computer program product of claim 13, wherein in response to determining that the access point has moved, the instructions cause the computer to:
   re-compute a geographic code; and
   insert the re-computed geographic code in the SSID of the beacon of the access point.

17. The computer program product of claim 13, wherein the instructions cause the computer to:
   retrieve a request for the geographic code;
   display a graphical user interface including the map;
   receive input from the user including an address;
   convert the address to coordinates for a location;
   generate the geographic code using the coordinates for the location; and
   output the geographic code.

18. The computer program product of claim 17, wherein the instructions cause the computer to display, on the graphical user interface, the geographic code in a comment box and an input address mark on the map near the location.

* * * * *